US012585209B2

(12) United States Patent
Tanaka et al.

(10) Patent No.: US 12,585,209 B2
(45) Date of Patent: Mar. 24, 2026

(54) TONER

(71) Applicant: CANON KABUSHIKI KAISHA, Tokyo (JP)

(72) Inventors: Masatake Tanaka, Kanagawa (JP); Shintaro Kawaguchi, Kanagawa (JP); Taiji Katsura, Shizuoka (JP); Dai Nozaki, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 419 days.

(21) Appl. No.: 18/173,512

(22) Filed: Feb. 23, 2023

(65) Prior Publication Data

US 2023/0273543 A1 Aug. 31, 2023

(30) Foreign Application Priority Data

Feb. 28, 2022 (JP) ................................ 2022-029572

(51) Int. Cl.
*G03G 9/097* (2006.01)
*G03G 9/107* (2006.01)
*G03G 9/087* (2006.01)

(52) U.S. Cl.
CPC ....... *G03G 9/1087* (2020.08); *G03G 9/08755* (2013.01)

(58) Field of Classification Search
CPC ............. G03G 9/09708; G03G 9/0975; G03G 9/09766; G03G 9/09783
See application file for complete search history.

(56) References Cited

U.S. PATENT DOCUMENTS

| | | | |
|---|---|---|---|
| 7,123,862 | B2 | 10/2006 | Hasegawa |
| 7,141,342 | B2 | 11/2006 | Toyoda |
| 7,264,910 | B2 | 9/2007 | Toyoda |
| 7,582,401 | B2 | 9/2009 | Ogawa |
| 7,611,812 | B2 | 11/2009 | Michel et al. |
| 7,678,523 | B2 | 3/2010 | Hiroko |
| 7,678,524 | B2 | 3/2010 | Hasegawa |

(Continued)

FOREIGN PATENT DOCUMENTS

| | | | | |
|---|---|---|---|---|
| CN | 100507727 | * | 7/2009 | G03G 9/08 |
| EP | 3709087 | * | 9/2020 | G03G 9/097 |

(Continued)

OTHER PUBLICATIONS

Translation of JP 2002-221820.*

(Continued)

*Primary Examiner* — Peter L Vajda
(74) *Attorney, Agent, or Firm* — VENABLE LLP

(57) ABSTRACT

A toner comprising: a toner particle comprising a binder resin; and an external additive at the surface of the toner particle, wherein, in a wettability test of the toner in a mixed methanol/water solvent, the methanol concentration at which the transmittance of light having a wavelength of 780 nm is 50% is 5 to 35 vol %, the external additive comprises a fluorine-containing particle, and the fluorine-containing particle is at least one selected from the group consisting of a fluorine-containing titania particle, a fluorine-containing silica particle, a fluorine-containing alumina particle, a fluorine-containing titanium composite oxide particle and a fluorine-containing hydrotalcite particle.

7 Claims, 3 Drawing Sheets

(56) References Cited

U.S. PATENT DOCUMENTS

| | | | |
|---|---|---|---|
| 7,833,685 | B2 | 11/2010 | Tanaka |
| 7,833,687 | B2 | 11/2010 | Kato |
| 7,923,190 | B2 | 4/2011 | Magome |
| 7,935,467 | B2 | 5/2011 | Dojo |
| 8,211,606 | B2 | 7/2012 | Murai |
| 8,227,162 | B2 | 7/2012 | Sano |
| 8,377,616 | B2 | 2/2013 | Tani |
| 8,426,091 | B2 | 4/2013 | Magome |
| 8,426,094 | B2 | 4/2013 | Magome |
| 8,518,620 | B2 | 8/2013 | Dojo |
| 8,614,044 | B2 | 12/2013 | Matsui |
| 8,628,899 | B2 | 1/2014 | Kawamura |
| 8,652,722 | B2 | 2/2014 | Yoshida et al. |
| 8,697,327 | B2 | 4/2014 | Shibata |
| 8,778,585 | B2 | 7/2014 | Matsui |
| 8,815,484 | B2 | 8/2014 | Tanaka |
| 8,828,639 | B2 | 9/2014 | Kamikura |
| 8,841,054 | B2 | 9/2014 | Dojo |
| 8,916,319 | B2 | 12/2014 | Ikeda |
| 8,940,467 | B2 | 1/2015 | Hashimoto |
| 9,034,549 | B2 | 5/2015 | Shiotari |
| 9,040,216 | B2 | 5/2015 | Fukudome |
| 9,116,448 | B2 | 8/2015 | Terauchi |
| 9,134,637 | B2 | 9/2015 | Hotta |
| 9,141,012 | B2 | 9/2015 | Moribe |
| 9,146,485 | B2 | 9/2015 | Tani |
| 9,152,065 | B2 | 10/2015 | Sano |
| 9,158,216 | B2 | 10/2015 | Shimano |
| 9,229,345 | B2 | 1/2016 | Ikeda |
| 9,235,151 | B2 | 1/2016 | Tanaka |
| 9,256,148 | B2 | 2/2016 | Fujikawa |
| 9,261,806 | B2 | 2/2016 | Moribe |
| 9,285,697 | B2 | 3/2016 | Fukudome |
| 9,377,705 | B2 | 6/2016 | Shimano |
| 9,377,708 | B2 | 6/2016 | Magome |
| 9,383,668 | B2 | 7/2016 | Noji |
| 9,423,714 | B2 | 8/2016 | Kenmoku |
| 9,470,993 | B2 | 10/2016 | Nishikawa |
| 9,500,972 | B2 | 11/2016 | Tanaka |
| 9,551,947 | B2 | 1/2017 | Hiroko |
| 9,556,290 | B2 | 1/2017 | Nishiura |
| 9,575,424 | B2 | 2/2017 | Nakagawa |
| 9,575,425 | B2 | 2/2017 | Naka |
| 9,588,450 | B2 | 3/2017 | Tsuda |
| 9,594,323 | B2 | 3/2017 | Fujikawa |
| 9,599,919 | B2 | 3/2017 | Isono |
| 9,606,462 | B2 | 3/2017 | Nomura |
| 9,632,441 | B2 | 4/2017 | Abe |
| 9,658,546 | B2 | 5/2017 | Tanaka |
| 9,658,549 | B2 | 5/2017 | Tanaka |
| 9,715,187 | B2 | 7/2017 | Mukumoto |
| 9,715,188 | B2 | 7/2017 | Terauchi |
| 9,720,340 | B2 | 8/2017 | Tominaga |
| 9,772,570 | B2 | 9/2017 | Tsuda |
| 9,778,583 | B2 | 10/2017 | Terauchi |
| 9,785,068 | B2 | 10/2017 | Umeda |
| 9,785,071 | B2 | 10/2017 | Shimano |
| 9,804,514 | B2 | 10/2017 | Suzumura |
| 9,804,519 | B2 | 10/2017 | Suzumura |
| 9,829,814 | B2 | 11/2017 | Yoshida |
| 9,829,816 | B2 | 11/2017 | Tanaka |
| 9,835,964 | B2 | 12/2017 | Yoshida |
| 9,841,692 | B2 | 12/2017 | Hasegawa |
| 9,857,707 | B2 | 1/2018 | Tsuda |
| 9,857,711 | B2 | 1/2018 | Yoshida |
| 9,880,478 | B2 | 1/2018 | Shimano |
| 9,904,193 | B2 | 2/2018 | Nakagawa |
| 9,904,195 | B2 | 2/2018 | Matsui |
| 9,927,728 | B2 | 3/2018 | Arimura |
| 9,946,179 | B2 | 4/2018 | Arimura |
| 9,946,181 | B2 | 4/2018 | Hasegawa |
| 9,952,523 | B2 | 4/2018 | Shimano |
| 9,958,801 | B2 | 5/2018 | Tanaka |
| 9,964,874 | B2 | 5/2018 | Suzumura |
| 9,964,881 | B2 | 5/2018 | Ikejiri |
| 9,971,262 | B2 | 5/2018 | Hasegawa |
| 9,971,263 | B2 | 5/2018 | Fukudome |
| 9,971,264 | B2 | 5/2018 | Sano |
| 10,012,919 | B2 | 7/2018 | Matsui |
| 10,012,923 | B2 | 7/2018 | Sano |
| 10,054,866 | B2 | 8/2018 | Tanaka |
| 10,101,683 | B2 | 10/2018 | Nishikawa |
| 10,114,303 | B2 | 10/2018 | Katsura |
| 10,156,800 | B2 | 12/2018 | Tsuda |
| 10,197,934 | B2 | 2/2019 | Matsui |
| 10,228,627 | B2 | 3/2019 | Nagashima |
| 10,289,016 | B2 | 5/2019 | Fukudome |
| 10,295,921 | B2 | 5/2019 | Ohmori |
| 10,303,074 | B2 | 5/2019 | Yamawaki |
| 10,310,396 | B2 | 6/2019 | Kamikura |
| 10,310,397 | B2 | 6/2019 | Sano |
| 10,338,487 | B2 | 7/2019 | Kamikura |
| 10,345,726 | B2 | 7/2019 | Nakamura |
| 10,353,308 | B2 | 7/2019 | Hatakeyama |
| 10,401,750 | B2 | 9/2019 | Nakamura |
| 10,429,757 | B2 | 10/2019 | Yoshida |
| 10,503,090 | B2 | 12/2019 | Tominaga |
| 10,539,893 | B2 | 1/2020 | Tanaka |
| 10,539,899 | B2 | 1/2020 | Nakamura |
| 10,545,420 | B2 | 1/2020 | Kinumatsu |
| 10,545,422 | B2 | 1/2020 | Yamawaki |
| 10,551,758 | B2 | 2/2020 | Tanaka |
| 10,578,990 | B2 | 3/2020 | Tsuda |
| 10,635,010 | B2 | 4/2020 | Kamikura |
| 10,635,011 | B2 | 4/2020 | Umeda |
| 10,698,327 | B2 | 6/2020 | Nagashima |
| 10,732,530 | B2 | 8/2020 | Matsui |
| 10,782,623 | B2 | 9/2020 | Yoshiba |
| 10,845,721 | B2 | 11/2020 | Tanaka |
| 10,845,722 | B2 | 11/2020 | Nishikawa |
| 10,859,933 | B2 | 12/2020 | Kinumatsu |
| 10,877,387 | B2 | 12/2020 | Fukudome |
| 10,877,388 | B2 | 12/2020 | Aoki |
| 10,877,389 | B2 | 12/2020 | Kamikura |
| 10,895,815 | B2 | 1/2021 | Kamikura |
| 10,942,466 | B2 | 3/2021 | Tominaga |
| 10,976,678 | B2 | 4/2021 | Yamawaki |
| 10,976,679 | B2 | 4/2021 | Tanaka |
| 11,003,103 | B2 | 5/2021 | Kinumatsu |
| 11,003,104 | B2 | 5/2021 | Katsura |
| 11,003,105 | B2 | 5/2021 | Sato |
| 11,092,905 | B2 | 8/2021 | Fukudome |
| 11,099,493 | B2 | 8/2021 | Komiya |
| 11,112,708 | B2 | 9/2021 | Uratani |
| 11,112,710 | B2 | 9/2021 | Nakayama |
| 11,112,712 | B2 | 9/2021 | Matsunaga |
| 11,112,714 | B2 | 9/2021 | Amano |
| 11,169,458 | B2 | 11/2021 | Toyoizumi |
| 11,169,460 | B2 | 11/2021 | Kototani |
| 11,175,600 | B2 | 11/2021 | Uchiyama |
| 11,181,839 | B2 | 11/2021 | Yamashita |
| 11,181,840 | B2 | 11/2021 | Nagata |
| 11,181,844 | B2 | 11/2021 | Nagaoka |
| 11,181,845 | B2 | 11/2021 | Shimoda |
| 11,181,846 | B2 | 11/2021 | Kinumatsu |
| 11,249,408 | B2 | 2/2022 | Tsuda |
| 11,249,412 | B2 | 2/2022 | Kawamura |
| 11,256,187 | B2 | 2/2022 | Ogaki |
| 11,287,758 | B2 | 3/2022 | Matsui |
| 11,314,178 | B2 | 4/2022 | Kenmoku |
| 11,333,989 | B2 | 5/2022 | Unno |
| 11,347,157 | B2 | 5/2022 | Kamikura |
| 11,448,980 | B2 | 9/2022 | Matsui |
| 11,531,282 | B2 | 12/2022 | Kamikura |
| 11,573,519 | B2 | 2/2023 | Fumita |
| 2009/0305159 | A1 | 12/2009 | Zhou et al. |
| 2015/0004540 | A1 | 1/2015 | Ozawa |
| 2015/0010652 | A1 | 1/2015 | Kurogi |
| 2018/0120721 | A1 | 5/2018 | Obara et al. |
| 2019/0064686 | A1 | 2/2019 | Terauchi |
| 2020/0285165 | A1 | 9/2020 | Chiba et al. |
| 2020/0292956 | A1 | 9/2020 | Amano |
| 2021/0003934 | A1 | 1/2021 | Fumita |
| 2021/0132519 | A1 | 5/2021 | Hashimoto |

(56) References Cited

U.S. PATENT DOCUMENTS

| | | | |
|---|---|---|---|
| 2021/0223731 | A1 | 7/2021 | Suzuki |
| 2021/0373450 | A1 | 12/2021 | Kawaguchi |
| 2021/0397110 | A1 | 12/2021 | Katsura |
| 2021/0405549 | A1 | 12/2021 | Ookubo |
| 2022/0026822 | A1 | 1/2022 | Sato |
| 2022/0026823 | A1 | 1/2022 | Sano |
| 2022/0121132 | A1 | 4/2022 | Yoshida |
| 2022/0121133 | A1 | 4/2022 | Yamawaki |
| 2022/0128915 | A1 | 4/2022 | Toyoda |
| 2022/0128916 | A1 | 4/2022 | Yoshida |
| 2022/0128919 | A1 | 4/2022 | Kawamura |
| 2022/0146952 | A1 | 5/2022 | Komiya |
| 2022/0146955 | A1 | 5/2022 | Nozaki |
| 2022/0171301 | A1 | 6/2022 | Suzumura |
| 2022/0171302 | A1 | 6/2022 | Sato |
| 2022/0171303 | A1 | 6/2022 | Hiramatsu |
| 2022/0206402 | A1 | 6/2022 | Uratani |
| 2022/0214629 | A1 | 7/2022 | Kenmoku |
| 2022/0214630 | A1 | 7/2022 | Kamikura |
| 2022/0291601 | A1 | 9/2022 | Katsura |
| 2022/0326633 | A1 | 10/2022 | Aoki |
| 2022/0365457 | A1 | 11/2022 | Unno |
| 2022/0373916 | A1 | 11/2022 | Adachi |
| 2022/0390870 | A1 | 12/2022 | Kyuushima |
| 2022/0390871 | A1 | 12/2022 | Isono |
| 2022/0397836 | A1 | 12/2022 | Toyoda |
| 2022/0404730 | A1 | 12/2022 | Nagaoka |
| 2023/0014130 | A1 | 1/2023 | Sano |
| 2023/0015518 | A1 | 1/2023 | Nozaki |
| 2023/0042289 | A1 | 2/2023 | Tanaka |
| 2023/0047510 | A1 | 2/2023 | Tsuda |
| 2023/0047560 | A1 | 2/2023 | Saeki |
| 2023/0080900 | A1 | 3/2023 | Kamikura |
| 2023/0117448 | A1 | 4/2023 | Fukudome |
| 2023/0122974 | A1 | 4/2023 | Kagawa |

FOREIGN PATENT DOCUMENTS

| | | | | | |
|---|---|---|---|---|---|
| JP | 55-28750 | A | | 2/1980 | |
| JP | 2000-35692 | A | | 2/2000 | |
| JP | 2002-221820 | | * | 8/2002 | .............. G03G 9/08 |
| JP | 2002-221820 | A | | 8/2002 | |
| JP | 2005-272323 | A | | 10/2005 | |
| JP | 2006-500605 | A | | 1/2006 | |
| JP | 2007-322953 | | | 12/2007 | |
| JP | 2009-42343 | A | | 2/2009 | |
| JP | 2013-68901 | A | | 4/2013 | |
| JP | 2014-209197 | A | | 11/2014 | |
| JP | 2015-11077 | | | 1/2015 | |
| JP | 2017-10002 | A | | 1/2017 | |
| JP | 2017-198929 | | | 11/2017 | |
| JP | 2019-45578 | | | 3/2019 | |
| JP | 2019-168632 | A | | 10/2019 | |
| JP | 2020-109511 | A | | 7/2020 | |
| JP | 2020-148928 | | | 9/2020 | |
| JP | 2021-9251 | | | 1/2021 | |
| WO | 2013/147284 | A1 | | 10/2013 | |
| WO | 2018/181189 | A | | 10/2018 | |

OTHER PUBLICATIONS

Translation of CN 100507727.*
Translation of EP 3709087.*
U.S. Appl. No. 18/046,585, Yuta Komiya, filed Oct. 14, 2022.
U.S. Appl. No. 18/173,247, Kosuke Fukudome, filed Feb. 23, 2023.
U.S. Appl. No. 18/173,255, Takayuki Toyoda, filed Feb. 23, 2023.
U.S. Appl. No. 18/173,278, Shohei Tsuda, filed Feb. 23, 2023.
U.S. Appl. No. 18/173,501, Taiji Katsura, filed Feb. 23, 2023.
U.S. Appl. No. 18/307,825, Hiroki Kagawa, filed Apr. 27, 2023.
U.S. Appl. No. 18/307,829, Kazuyuki Sato, filed Apr. 27, 2023.
U.S. Appl. No. 18/307,832, Shohei Shibahara, filed Apr. 27, 2023.
Kyowa Chemical Industry DHT-4A technical data sheet (2025).

* cited by examiner

TONER

BACKGROUND OF THE INVENTION

Field of the Invention

The present disclosure relates to a toner used in image-forming methods such as electrophotographic methods, electrostatic recording methods and toner jet methods.

Description of the Related Art

In recent years, there have been demands for printers and copiers to exhibit higher speeds and longer service lives, and development is needed of a toner that exhibits excellent charging performance and retention of charging performance throughout the service life of the toner.

With these demands in mind, Japanese Patent Application Publication No. 2017-010002 proposes a toner that exhibits excellent charging performance through use of titanium dioxide particles that are surface treated with a fluorine-containing silane coupling agent.

SUMMARY OF THE INVENTION

The toner mentioned above exhibits improved charge quantity, charging speed and charging performance, but problems remain in terms of retaining this charging performance throughout the service life of the toner. Simply by introducing fluorine because of the high charging performance of fluorine, as in the toner mentioned above, a charging distribution occurs in a toner particle, and this leads to a decrease in fluidity and the occurrence of fogging. Therefore, there is a need for a toner which can solve these problems by improving charging performance and retention of charging performance.

The present disclosure provides a toner which exhibits excellent charging performance throughout the service life of the toner, exhibits good fluidity, and undergoes little fogging.

The present disclosure relates to a toner comprising:

a toner particle comprising a binder resin; and an external additive at the surface of the toner particle, wherein, in a wettability test of the toner in a mixed methanol/water solvent, the methanol concentration at which the transmittance of light having a wavelength of 780 nm is 50% is 5 to 35 vol %, the external additive comprises a fluorine-containing particle, and the fluorine-containing particle is at least one selected from the group consisting of a fluorine-containing titania particle, a fluorine-containing silica particle, a fluorine-containing alumina particle, a fluorine-containing titanium composite oxide particle and a fluorine-containing hydrotalcite particle.

The present disclosure provides a toner which exhibits excellent charging performance throughout the service life of the toner, exhibits good fluidity, and undergoes little fogging.

Further features of the present invention will become apparent from the following description of exemplary embodiments with reference to the attached drawings.

DESCRIPTION OF THE EMBODIMENTS

Figure 1:
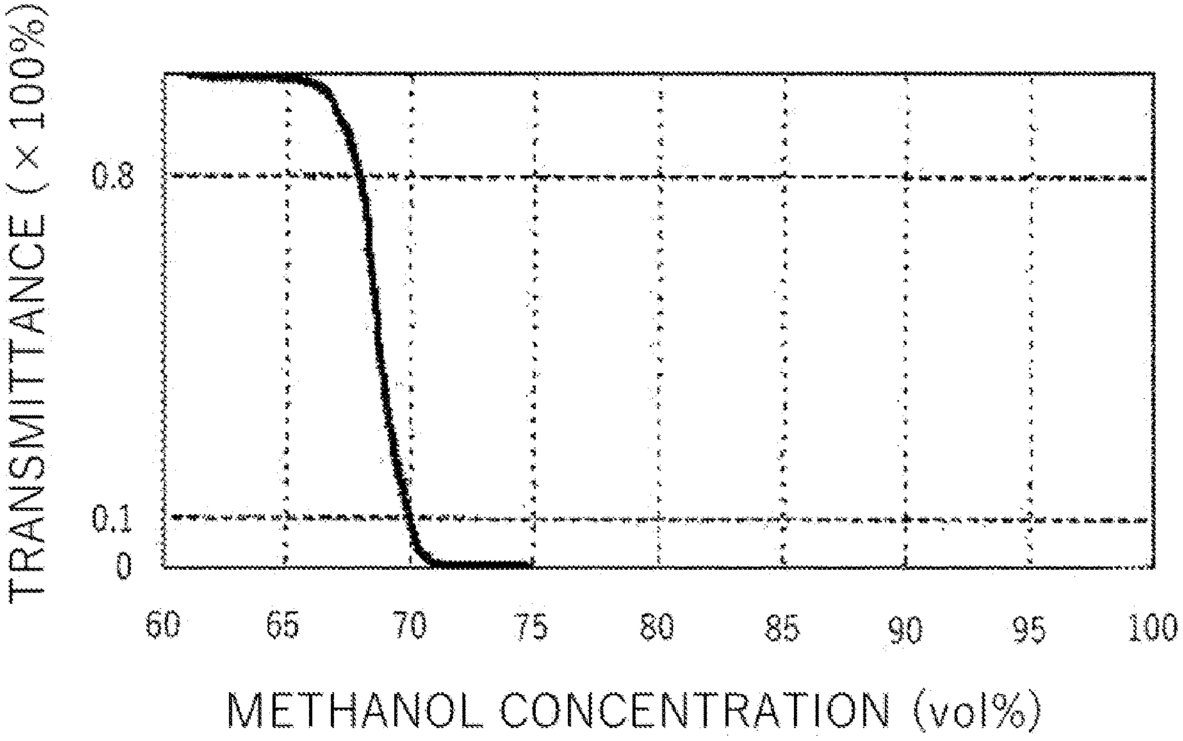
FIG. 1 is a methanol dropping transmittance curve.

In the present disclosure, the terms "from XX to YY" and "XX to YY", which indicate numerical ranges, mean numerical ranges that include the lower limits and upper limits that are the end points of the ranges. In cases where numerical ranges are indicated incrementally, upper limits and lower limits of the numerical ranges can be arbitrarily combined.

In the present disclosure, the term "(meth)acrylic" means "acrylic" and/or "methacrylic".

The toner of the present disclosure will now be explained in greater detail.

As a result of diligent research into solving the above-mentioned problems in the prior art, the inventors of the present invention found that the problems mentioned above could be solved by using a specific fluorine-containing external additive and controlling the methanol concentration at which the transmittance of light having a wavelength of 780 nm is 50% within a specific range in a wettability test with a mixed methanol/water solvent.

That is, the present disclosure relates to a toner which comprises: a toner particle that comprises a binder resin; and an external additive at the surface of the toner particle, wherein, in a wettability test of the toner in a mixed methanol/water solvent, the methanol concentration at which the transmittance of light having a wavelength of 780 nm is 50% is 5 to 35 vol %, the external additive contains a fluorine-containing particle, and the fluorine-containing particle is at least one selected from the group consisting of a fluorine-containing titania particle, a fluorine-containing silica particle, a fluorine-containing alumina particle, a fluorine-containing titanium composite oxide particle and a fluorine-containing hydrotalcite particle.

The inventors of the present invention consider that the reasons why the toner mentioned above can solve the problems mentioned above are as follows.

Fluorine-containing external additives exhibit strong negative charging performance as a triboelectric series, which tends to improve charge quantity and charging speed. However, this causes localized charging within the toner and tends to cause uneven charging. This type of charging unevenness causes a decreases in fluidity and causes fogging. The effect of this is particularly significant in low temperature low humidity environments.

However, because charging performance decreases and fogging occurs due to external additives absorbing moisture in high temperature high humidity environments, hydrophobically treated external additives are generally used in order to improve charging performance in high temperature high humidity environments. However, hydrophobically treated external additives exhibit lower electrical conductivity, and therefore tend to foster the charging unevenness caused by fluorine-containing external additives.

In the present disclosure, the methanol concentration at which the transmittance of light having a wavelength of 780 nm is 50% is 5 to 35 vol % in a wettability test of the toner with a mixed methanol/water solvent. Therefore, in the case of a toner containing a specific fluorine-containing external additive, by imparting the surface of the toner with hydrophilic properties in order to attain the methanol concentration mentioned above, charge quantity and charging speed are improved, and moisture in air tends to be adsorbed at the surface of the toner. Because electrical conductivity is improved by this configuration, it is thought charging unevenness in the toner is alleviated, and a decrease in fluidity and the occurrence of fogging are suppressed.

With regard to properties of the surface of the toner, if the methanol concentration mentioned above is less than 5 vol %, fogging tends to occur in high temperature high humidity environments. However, if this methanol concentration exceeds 35 vol %, the bottom part of a solid image can be missing or fogged. The methanol concentration mentioned above is preferably 10 to 30 vol %, and more preferably 15 to 25 vol %.

The methanol concentration mentioned above can be controlled by varying the amount of hydroxyl groups remaining in the external additive or the amount of water of hydration. For example, by using ordinary hydrophobized silica particles, such as silica particles 7 used in working examples given below, the methanol concentration mentioned above tends to exceed the upper limit mentioned above.

The external additive contains fluorine-containing particles. The fluorine-containing particles are at least one type of particles selected from the group consisting of fluorine-containing titania particles, fluorine-containing silica particles, fluorine-containing alumina particles, fluorine-containing titanium composite oxide particles and fluorine-containing hydrotalcite particles. It is possible to use well-known particles as these particles.

Examples of titanium composite oxide particles include strontium titanate particles, calcium titanate particles, magnesium titanate particles and zinc titanate particles. Strontium titanate particles are preferred.

The fluorine-containing particles more preferably include at least one type of particles selected from the group consisting of fluorine-containing titania particles, fluorine-containing silica particles, fluorine-containing alumina particles, fluorine-containing strontium titanate particles and fluorine-containing hydrotalcite particles, and further preferably include at least one type of particles selected from the group consisting of fluorine-containing titania particles, fluorine-containing alumina particles, fluorine-containing strontium titanate particles and fluorine-containing hydrotalcite particles.

The fluorine-containing particles preferably include fluorine-containing hydrotalcite particles, and more preferably are fluorine-containing hydrotalcite particles. If a printer is used over a long period of time, external additives become contaminated with other external additives and resins, and the function of the external additive can be compromised. Hydrotalcite has a layered structure, and therefore tends to have a structure in which fluorine is intercalated between layers. Therefore, this type of deterioration in the function of the external additive during long term use is suppressed. The reasons for this are thought to be because the surface of the external additive is unlikely to become contaminated due to the external additive encapsulating fluorine, and the function of the external additive is restored due to a new surface being generated as a result of the external additive undergoing splitting and so on during use.

The hydrotalcite particle may be one represented by the following structural formula (5):

$$M^{2+}{}_{y}M^{3+}{}_{x}(OH)_2A^{n-}{}_{(x/n)}\cdot mH_2O \qquad \text{formula (5)}$$

in which $M^{2+}$ and $M^{3+}$ represent bivalent and trivalent metals, respectively.

The hydrotalcite particle may also be a solid solution containing multiple different elements. It may also contain a trace amount of a monovalent metal.

However, preferably $0<x<0.5$, $y=1-x$, and $m>0$.

$M^{2+}$ is preferably at least one bivalent metal ion selected from the group consisting of Mg, Zn, Ca, Ba, Ni, Sr, Cu and Fe.

$M^{3+}$ is preferably at least one trivalent metal ion selected from the group consisting of Al, B, Ga, Fe, Co and In.

$A^{n-}$ is an anion having a valency of n, and includes at least $F^-$, and $CO_{32}{}^-$, $OH^-$, $Cl^-$, $I^-$, $Br^-$, $SO_4{}^{2-}$, $HCO_3{}^-$, $CH_3COO^-$, $NO_3{}^-$, and the like, may also be present.

The method for incorporating fluorine in titania particles, silica particles, alumina particles, titanium composite oxide particles or hydrotalcite particles is not particularly limited, and examples thereof include treating with a fluorine-containing coupling agent and treating in an aqueous solution containing fluoride ions. A method in which a wet treatment is carried out in an aqueous solution containing fluoride ions is preferred from the perspective of treatment uniformity. For example, fluorine-containing hydrotalcite particles are preferably fluorine-treated hydrotalcite particles, and are more preferably hydrotalcite particles that have been treated with fluoride ions.

The divalent metal ion $M^{2+}$ mentioned above is preferably magnesium, and the trivalent metal ion $M^{3+}$ mentioned above is preferably aluminum. That is, the fluorine-containing hydrotalcite particles preferably contain magnesium and aluminum.

The concentration ratio of the number of magnesium atoms relative to aluminum atoms (Mg/Al element ratio) in the fluorine-containing hydrotalcite particles, as determined by primary component mapping of the fluorine-containing hydrotalcite particles in STEM-EDS mapping analysis of the toner, is preferably 1.3 to 4.5, more preferably 1.5 to 4.0, further preferably 2.0 to 3.5, and yet more preferably 2.5 to 3.0. If the Mg/Al ratio is 1.3 or more, fogging tends to be better suppressed in high temperature high humidity environments, and if the Mg/Al ratio is 4.5 or less, charging performance durability tends to be further improved. The Mg/Al ratio can be controlled by adjusting amounts of raw materials when hydrotalcite is produced.

Fluorine and aluminum are preferably present in the inner part of the fluorine-containing hydrotalcite particles in line analysis in STEM-EDS mapping analysis of the toner. It can be confirmed that fluorine is intercalated between layers in the layered structure of the hydrotalcite particles due to this configuration.

In addition, the concentration ratio of the number of fluorine atoms relative to aluminum atoms (F/Al element ratio) in the fluorine-containing hydrotalcite particles, as determined by primary component mapping of the fluorine-containing hydrotalcite particles in STEM-EDS mapping analysis of the toner, is preferably 0.01 to 0.65, more preferably 0.02 to 0.60, further preferably 0.05 to 0.30, and yet more preferably 0.07 to 0.20.

If the F/Al ratio is 0.01 or more, the charging performance improvement effect of the fluorine tends to be better achieved. If the F/Al ratio is 0.65 or less, components are unlikely to become contaminated by fluorine, and a decrease in the charging performance of the toner and the occurrence of fogging tend to be better suppressed. The F/Al ratio can be controlled by adjusting the concentration of fluorine when hydrotalcite is produced.

In addition, the fluorine-containing hydrotalcite particles preferably have water in the molecule. Specifically, it is more preferable for $0.1<m<0.6$ in formula (5).

The number average particle diameter of primary particles of the fluorine-containing hydrotalcite particles is preferably 60 to 1000 nm, more preferably 100 to 800 nm, and further preferably 200 to 600 nm.

If this particle diameter is 1000 nm or less, the fluidity of the toner tends to be further improved, thereby enabling a decrease in charging performance over time to be suppressed.

The fluorine-containing hydrotalcite particles may be subjected to a hydrophobic treatment using a surface treatment agent in addition to a fluorine treatment. Higher fatty acids, coupling agents, esters and oils such as silicone oils can be used as surface treatment agents. Of these, higher fatty acids are preferably used, and specific examples of these include stearic acid, oleic acid and lauric acid.

The ratio of the number of fluorine-containing hydrotalcite particles relative to the number of toner particles is not particularly limited, but is preferably from 0.1 to 100. This ratio is more preferably from 0.4 to 90. This ratio is further preferably from 1 to 20. Within the ranges mentioned above, a charging performance-imparting effect tends to be achieved by the fluorine-containing hydrotalcite particles, and component contamination is unlikely to occur.

The content of the fluorine-containing hydrotalcite particles is not particularly limited, but is preferably 0.01 to 3.00 parts by mass, more preferably 0.05 to 0.50 parts by mass, and further preferably 0.20 to 0.40 parts by mass, relative to 100 parts by mass of the toner particles. The content of the fluorine-containing hydrotalcite particles can be quantitatively determined by X-Ray fluorescence analysis using a calibration curve prepared from a standard sample.

The fixing ratio of the fluorine-containing particles to the toner particles is preferably 10 to 95%. This fixing ratio is more preferably 40 to 95%, and further preferably 50 to 70%. Within the ranges mentioned above, it is possible to better suppress the occurrence of charging unevenness caused by localized aggregation of the external additive. The fixing ratio of the external additive can be controlled by altering external addition conditions in a well-known external addition method.

In addition, the areal ratio of the fluorine-containing particles relative to the toner particle in an EDS measurement field of view, as measured by STEM-EDS mapping analysis of the toner, is preferably 0.07 to 0.54%, more preferably 0.25 to 0.50%, and further preferably 0.35 to 0.45%. The effect of the fluorine-containing particles is readily achieved within the ranges mentioned above.

The areal ratio mentioned above can be controlled by altering the amount of fluorine-containing particles introduced.

The external additive preferably also contains silica particles that do not contain fluorine in addition to a fluorine-containing external additive. The effect mentioned above tends to be more readily achieved by controlling the hydrophilic properties of the toner surface with the silica particles that do not contain fluorine.

The content of the silica particles that do not contain fluorine is not particularly limited, but is preferably 0.1 to 3.0 parts by mass, and more preferably 0.5 to 2.0 parts by mass, relative to 100 parts by mass of the toner particles.

The number average particle diameter of primary particles of the silica particles that do not contain fluorine is preferably 50 to 300 nm, and more preferably 80 to 200 nm.

The loss on heating from 200° C. to 400° C. of the silica particles that do not contain fluorine, as determined using a thermal analysis apparatus (TGA), is preferably 0.5 to 8 mass %, more preferably 2 to 6 mass %, and further preferably 3 to 5 mass %. This loss on heating is derived from hydroxyl groups in the silica particles that do not contain fluorine, and is preferred in order to control the properties of the surface of the toner while imparting the toner with fluidity, which is fundamentally necessary in electrophotography processes.

If this loss on heating is 0.5 mass % or more, solid image following properties is improved, and if this loss on heating is 8 mass % or less, fogging tends to be better suppressed. Loss on heating can be controlled by adjusting the degree of condensation by altering the reaction time when the external additive is produced, the temperature in a drying step, and so on.

Methods for producing components that constitute the toner and a method for producing the toner will now be explained in greater detail.

Binder Resin

The toner particle contains a binder resin.

For the binder resin, the following resins and polymers can be given as examples of polyester resins, vinyl-based resins, and other binder resins. Examples thereof include styrene acrylic resins, polyester resins, epoxy resins, polyurethane resins, polyamide resins, cellulose resins, polyether resins, and mixed resins and complex resins of these.

From the perspectives of being inexpensive and easy to procure and exhibiting excellent low-temperature fixability, the binder resin is preferably a polyester resin, a styrene acrylic resin or a hybrid resin of these, and is more preferably a styrene acrylic resin.

The polyester resin can be obtained by using a conventional well-known method, such as a transesterification method or a polycondensation method, by selecting and combining appropriate materials from among polycarboxylic acids, polyols, hydroxycarboxylic acids, and the like.

A polycarboxylic acid is a compound having 2 or more carboxyl groups per molecule. Of these, a dicarboxylic acid is a compound having 2 carboxyl groups per molecule, and is preferably used.

Examples of dicarboxylic acids include oxalic acid, succinic acid, glutaric acid, maleic acid, adipic acid, β-methyladipic acid, azelaic acid, sebacic acid, nonanedicarboxylic acid, decanedicarboxylic acid, undecanedicarboxylic acid, dodecanedicarboxylic acid, fumaric acid, citraconic acid, diglycolic acid, cyclohexane-3,5-diene-1,2-carboxylic acid, hexahydroterephthalic acid, malonic acid, pimelic acid, suberic acid, phthalic acid, isophthalic acid, terephthalic acid, tetrachlorophthalic acid, chlorophthalic acid, nitrophthalic acid, p-carboxyphenylacetic acid, p-phenylenediacetic acid, m-phenylenediacetic acid, o-phenylenediacetic acid, diphenylacetic acid, diphenyl-p,p'-dicarboxylic acid, naphthalene-1,4-dicarboxylic acid, naphthalene-1,5-dicarboxylic acid, naphthalene-2,6-dicarboxylic acid, anthracenedicarboxylic acid and cyclohexanedicarboxylic acid.

Examples of polycarboxylic acids other than the dicarboxylic acids mentioned above include trimellitic acid, trimesic acid, pyromellitic acid, naphthalenetricarboxylic acid, naphthalenetetracarboxylic acid, pyrenetricarboxylic acid, pyrenetetracarboxylic acid, itaconic acid, glutaconic acid, n-dodecylsuccinic acid, n-dodecenylsuccinic acid, isododecylsuccinic acid, isododecenylsuccinic acid, n-octylsuccinic acid and n-octenylsuccinic acid. It is possible to use one of these polycarboxylic acids in isolation or a combination of two or more types thereof.

A polyol is a compound having 2 or more hydroxyl groups per molecule. Of these, a diol is a compound having 2 hydroxyl groups per molecule, and is preferably used.

Specific examples include ethylene glycol, diethylene glycol, triethylene glycol, 1,2-propylene glycol, 1,3-propylene glycol, 1,4-butane diol, 1,5-pentane diol, 1,6-hexane diol, 1,7-heptane diol, 1,8-octane diol, 1,9-nonane diol, 1,10-decane diol, 1,11-undecane diol, 1,12-dodecane diol, 1,13-tridecane diol, 1,14-tetradecane diol, 1,18-octadecane diol, 1,14-eicosane diol, dipropylene glycol, polyethylene glycol, polypropylene glycol, polytetramethylene ether glycol, 1,4-cyclohexane diol, 1,4-cyclohexane dimethanol, 1,4-butene diol, neopentyl glycol, 1,4-cyclohexane diol, polytetramethylene glycol, hydrogenated bisphenol A, bisphenol A, bisphenol F, bisphenol S, and alkylene oxide (ethylene oxide, propylene oxide, butylene oxide and the like) adducts of these bisphenol compounds.

Of these, alkylene glycols having 2 to 12 carbon atoms and alkylene oxide adducts of bisphenol compounds are preferred, and alkylene oxide adducts of bisphenol compounds and combinations of alkylene oxide adducts of bisphenol compounds and alkylene glycols having 2 to 12 carbon atoms are particularly preferred.

Examples of trihydric or higher polyols include glycerin, trimethylolethane, trimethylolpropane, pentaerythritol, hexamethylolmelamine, hexaethylolmelamine, tetramethylolbenzoguanamine, tetraethylolbenzoguanamine, sorbitol, trisphenol PA, phenol novolac, cresol novolac and alkylene oxide adducts of the trihydric or higher polyphenol compounds listed above. It is possible to use one of these trihydric or higher polyols in isolation or a combination of two or more types thereof. In addition, the polyester resin may be a urea group-containing polyester resin. The polyester resin is preferably one in which a carboxyl group at a terminal or the like is not capped.

Examples of styrene acrylic resins include homopolymers comprising polymerizable monomers listed below, copolymers obtained by combining two or more of these polymerizable monomers, and mixtures of these.

Styrene-based monomers such as styrene, α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene and p-phenylstyrene; (meth)acrylic monomers such as methyl (meth)acrylate, ethyl (meth)acrylate, n-propyl (meth)acrylate, iso-propyl (meth)acrylate, n-butyl (meth)acrylate, iso-butyl (meth)acrylate, tert-butyl (meth)acrylate, n-amyl (meth)acrylate, n-hexyl (meth)acrylate, 2-ethylhexyl (meth)acrylate, n-octyl (meth)acrylate, n-nonyl (meth)acrylate, cyclohexyl (meth)acrylate, benzyl (meth)acrylate, dimethyl phosphate ethyl (meth)acrylate, diethyl phosphate ethyl (meth)acrylate, dibutyl phosphate ethyl (meth)acrylate, 2-benzoyloxyethyl (meth)acrylate, (meth)acrylonitrile, 2-hydroxyethyl (meth)acrylate, (meth) acrylic acid and maleic acid; Vinyl ether-based monomers such as vinyl methyl ether and vinyl isobutyl ether; and vinyl ketone-based monomers such as vinyl methyl ketone, vinyl ethyl ketone and vinyl isopropenyl ketone; Polyolefins of ethylene, propylene, butadiene, and the like.

The styrene acrylic resin can be obtained using a polyfunctional polymerizable monomer if necessary. Examples of polyfunctional polymerizable monomers include diethylene glycol di(meth)acrylate, triethylene glycol di(meth)acrylate, tetraethylene glycol di(meth)acrylate, polyethylene glycol di(meth)acrylate, 1,6-hexane diol di(meth)acrylate, neopentyl glycol di(meth)acrylate, tripropylene glycol di(meth)acrylate, polypropylene glycol di(meth)acrylate, 2,2'-bis(4-((meth)acryloxydiethoxy)phenyl)propane, trimethylolpropane tri(meth)acrylate, tetramethylolpropane tetra(meth)acrylate, divinylbenzene, divinylnaphthalene and divinyl ether.

In addition, it is possible to further add well-known chain transfer agents and polymerization inhibitors in order to control the degree of polymerization.

Examples of polymerization initiators used for obtaining the styrene acrylic resin include organic peroxide-based initiators and azo-based polymerization initiators.

Examples of organic peroxide-based initiators include benzoyl peroxide, lauroyl peroxide, di-α-cumyl peroxide, 2,5-dimethyl-2,5-bis(benzoyl peroxy)hexane, bis(4-t-butylcyclohexyl) peroxydicarbonate, 1,1-bis(t-butyl peroxy)cyclododecane, t-butyl peroxymaleic acid, bis(t-butyl peroxy) isophthalate, methyl ethyl ketone peroxide, tert-butyl peroxy-2-ethylhexanoate, diisopropyl peroxycarbonate, cumene hydroperoxide, 2,4-dichlorobenzoyl peroxide and tert-butyl-peroxypivalate.

Examples of azo type initiators include 2,2'-azobis(2,4-dimethylvaleronitrile), 2,2'-azobisisobutyronitrile, 1,1'-azobis(cyclohexane-1-carbontrile), 2,2'-azobis-4-methoxy-2,4-dimethylvaleronitrile, azobis(methylbutyronitrile) and 2,2'-azobis-(methylisobutyrate).

In addition, a redox type initiator obtained by combining an oxidizing substance with a reducing substance can be used as a polymerization initiator.

Examples of oxidizing substances include inorganic peroxides such as hydrogen peroxide and persulfates (sodium salts, potassium salts and ammonium salts), and oxidizing metal salts such as tetravalent cerium salts.

Examples of reducing substances include reducing metal salts (divalent iron salts, monovalent copper salts and trivalent chromium salts), ammonia, amino compounds such as lower amines (amines having from 1 to 6 carbon atoms, such as methylamine and ethylamine) and hydroxylamine, reducing sulfur compounds such as sodium thiosulfate, sodium hydrosulfite, sodium hydrogen sulfite, sodium sulfite and aldehyde sulfoxylates, lower alcohols (having from 1 to 6 carbon atoms), ascorbic acid and salts thereof, and lower aldehydes (having from 1 to 6 carbon atoms).

The polymerization initiator is selected with reference to 10-hour half-life decomposition temperatures, and can be a single polymerization initiator or a mixture thereof. The added amount of polymerization initiator varies according to the target degree of polymerization, but is generally an amount of from 0.5 parts by mass to 20.0 parts by mass relative to 100.0 parts by mass of polymerizable monomer.

The binder resin may contain a crystalline polyester. Examples of the crystalline polyester include condensation polymerization products of aliphatic diols and aliphatic dicarboxylic acids.

The crystalline polyester resin is preferably a condensation polymerization product of an aliphatic diol having from 2 to 12 carbon atoms and an aliphatic dicarboxylic acid having from 2 to 12 carbon atoms as primary components. Examples of aliphatic diols having from 2 to 12 carbon atoms include the compounds listed below. 1,2-ethane diol, 1,3-propane diol, 1,4-butane diol, 1,5-pentane diol, 1,6-hexane diol, 1,7-heptane diol, 1,8-octane diol, 1,9-nonane diol, 1,10-decane diol, 1,11-undecane diol, 1,12-dodecane diol, and the like.

In addition, an aliphatic diol having a double bond can be used. Examples of aliphatic diols having a double bond include the compounds listed below. 2-butene-1,4-diol, 3-hexene-1,6-diol and 4-octene-1,8-diol.

Examples of aliphatic dicarboxylic acids having from 2 to 12 carbon atoms include the compounds listed below. Oxalic acid, malonic acid, succinic acid, glutaric acid, adipic acid, pimelic acid, suberic acid, azelaic acid, sebacic acid, 1,9-nonanedicarboxylic acid, 1,10-decanedicarboxylic acid, 1,11-undecanedicarboxylic acid, 1,12-dodecanedicarboxylic acid, and lower alkyl esters and acid anhydrides of these aliphatic dicarboxylic acids.

Of these, sebacic acid, adipic acid, 1,10-decanedicarboxylic acid, and lower alkyl esters and acid anhydrides of these are preferred. It is possible to use one of these aliphatic polycarboxylic acids in isolation, or a mixture of two or more types thereof.

In addition, an aromatic dicarboxylic acid can be used. Examples of aromatic dicarboxylic acids include the compounds listed below. Terephthalic acid, isophthalic acid, 2,6-naphthalenedicarboxylic acid and 4,4'-biphenyldicarboxylic acid. Of these, terephthalic acid is preferred from perspectives such as ease of procurement and ease of forming a low melting point polymer.

In addition, a dicarboxylic acid having a double bond can be used. A dicarboxylic acid having a double bond can crosslink the entire resin by means of the double bond, and can be advantageously used in order to suppress hot offsetting at the time of fixing.

Examples of such dicarboxylic acids include fumaric acid, maleic acid, 3-hexene dioic acid and 3-octene dioic acid. In addition, lower alkyl esters and acid anhydrides of these can also be used. Of these, fumaric acid and maleic acid are more preferred.

The method for producing the crystalline polyester is not particularly limited, and it is possible to produce the crystalline polyester by means of an ordinary polyester polymerization method in which a dicarboxylic acid component is reacted with a diol component. For example, it is possible to use a direct polycondensation method or a transesterification method, and the crystalline polyester can be produced using either of these methods depending on the type of monomer used.

The content of the crystalline polyester is preferably from 1.0 parts by mass to 30.0 parts by mass, and more preferably from 3.0 parts by mass to 25.0 parts by mass, relative to 100 parts by mass of the binder resin.

The peak temperature of the maximum endothermic peak of the crystalline polyester, as measured using a differential scanning calorimeter (DSC), is preferably from 50.0° C. to 100.0° C., and is more preferably from 60.0° C. to 90.0° C. from the perspective of low-temperature fixability.

The molecular weight of the binder resin is such that the peak molecular weight Mp is preferably from 5000 to 100,000, and more preferably from 10,000 to 40,000. The glass transition temperature Tg of the binder resin is preferably from 40° C. to 70° C., and more preferably from 40° C. to 60° C. The content of the binder resin is preferably 50 mass % or more relative to the entire amount of resin components in the toner particle.

Crosslinking Agent

To control the molecular weight of the binder resin constituting the toner particle, a crosslinking agent may also be added during polymerization of the polymerizable monomers.

Examples include ethylene glycol dimethacrylate, ethylene glycol diacrylate, diethylene glycol dimethacrylate, diethylene glycol diacrylate, triethylene glycol dimethacrylate, triethylene glycol diacrylate, neopentyl glycol dimethacrylate, neopentyl glycol diacrylate, divinyl benzene, bis(4-acryloxypolyethoxyphenyl) propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, diacrylates of polyethylene glycol #200, #400 and #600, dipropylene glycol diacrylate, polypropylene glycol diacrylate, polyester diacrylate (MANDA, Nippon Kayaku Co., Ltd.), and these with methacrylate substituted for the acrylate.

The added amount of the crosslinking agent is preferably from 0.001 to 15.000 mass parts per 100 mass parts of the polymerizable monomers.

Release Agent

A well-known wax can be used as a release agent in the toner.

Specific examples thereof include petroleum-based waxes and derivatives thereof, such as paraffin waxes, microcrystalline waxes and petrolatum, montan wax and derivatives thereof, hydrocarbon waxes and derivatives thereof obtained using the Fischer Tropsch process, polyolefin waxes and derivatives thereof, such as polyethylene waxes and polypropylene waxes, and natural waxes and derivatives thereof, such as carnauba wax and candelilla wax. Derivatives include oxides, block copolymers formed with vinyl monomers, and graft-modified products.

Further examples include higher aliphatic alcohols; fatty acids, such as stearic acid and palmitic acid, and amides, esters and ketones of these acids; hydrogenated castor oil and derivatives thereof, plant waxes and animal waxes. It is possible to use one of these release agents in isolation, or a combination thereof.

Of these, use of a polyolefin, a hydrocarbon wax produced using the Fischer Tropsch process or a petroleum-based wax is preferred from the perspectives of developing performance and transferability being improved. Moreover, antioxidants may be added to these waxes as long as the characteristics of the toner are not adversely affected.

In addition, from the perspectives of phase separation from the binder resin and crystallization temperature, preferred examples include higher fatty acid esters such as behenyl behenate and dibehenyl sebacate.

The content of the release agent is preferably from 1.0 parts by mass to 30.0 parts by mass relative to 100.0 parts by mass of the binder resin.

The melting point of the release agent is preferably from 30° C. to 120° C., and more preferably from 60° C. to 100° C. By using a release agent having a melting point of from 30° C. to 120° C., a releasing effect is efficiently achieved and a broader fixing range is ensured.

Plasticizer

A crystalline plasticizer is preferably used in order to improve the sharp melt properties of the toner. The plasticizer is not particularly limited, and well-known plasticizers used in toners, such as those listed below, can be used.

Examples thereof include esters of monohydric alcohols and aliphatic carboxylic acids and esters of monohydric carboxylic acids and aliphatic alcohols, such as behenyl behenate, stearyl stearate and palmityl palmitate; esters of dihydric alcohols and aliphatic carboxylic acids and esters of dihydric carboxylic acids and aliphatic alcohols, such as ethylene glycol distearate, dibehenyl sebacate and hexane diol dibehenate; esters of trihydric alcohols and aliphatic carboxylic acids and esters of trihydric carboxylic acids and aliphatic alcohols, such as glycerin tribehenate; esters of tetrahydric alcohols and aliphatic carboxylic acids and esters of tetrahydric carboxylic acids and aliphatic alcohols, such as pentaerythritol tetrastearate and pentaerythritol tetrapalmitate; esters of hexahydric alcohols and aliphatic carboxylic acids and esters of hexahydric carboxylic acids and aliphatic alcohols, such as dipentaerythritol hexastearate and dipentaerythritol hexapalmitate; esters of polyhydric alcohols and aliphatic carboxylic acids and esters of polycarboxylic acids and aliphatic alcohols, such as polyglycerol behenate; and natural ester waxes such as carnauba wax and rice wax. It is possible to use one of these plasticizers in isolation, or a combination thereof.

Colorant

The toner particle may contain a colorant. A well-known pigment or dye can be used as the colorant. From the perspective of excellent weathering resistance, a pigment is preferred as the colorant.

Examples of cyan colorants include copper phthalocyanine compounds and derivatives thereof, anthraquinone compounds and basic dye lake compounds.

Specific examples thereof include the following. C.I. Pigment Blue 1, 7, 15, 15:1, 15:2, 15:3, 15:4, 60, 62 and 66.

Examples of magenta colorants include condensed azo compounds, diketopyrrolopyrrole compounds, anthraquinone compounds, quinacridone compounds, basic dye lake compounds, naphthol compounds, benzimidazolone compounds, thioindigo compounds and perylene compounds.

Specific examples thereof include the following. C.I. Pigment Red 2, 3, 5, 6, 7, 23, 48:2, 48:3, 48:4, 57:1, 81:1, 122, 144, 146, 150, 166, 169, 177, 184, 185, 202, 206, 220, 221 and 254, and C.I. Pigment Violet 19.

Examples of yellow colorants include condensed azo compounds, isoindolinone compounds, anthraquinone compounds, azo metal complexes, methine compounds and allylamide compounds.

Specific examples thereof include the following. C.I. Pigment Yellow 12, 13, 14, 15, 17, 62, 74, 83, 93, 94, 95, 97, 109, 110, 111, 120, 127, 128, 129, 147, 151, 154, 155, 168, 174, 175, 176, 180, 181, 185, 191 and 194.

Examples of black colorants include carbon black and materials colored black using the yellow colorants, magenta colorants and cyan colorants mentioned above.

It is possible to use one of these colorants in isolation, or a combination thereof, and these can be used in the form of solid solutions.

The content of the colorant is preferably from 1.0 parts by mass to 20.0 parts by mass relative to 100.0 parts by mass of the binder resin.

Charge Control Agent and Charge Control Resin

The toner particle may contain a charge control agent or a charge control resin. A well-known charge control agent can be used, and a charge control agent which has a fast triboelectric charging speed and can stably maintain a certain triboelectric charge quantity is particularly preferred. Furthermore, in a case where a toner particle is produced using a suspension polymerization method, a charge control agent which exhibits low polymerization inhibition properties and which is substantially insoluble in an aqueous medium is particularly preferred.

Examples of charge control agents that impart the toner particle with negative chargeability include monoazo metal compounds, acetylacetone metal compounds, aromatic oxycarboxylic acid, aromatic dicarboxylic acid, oxycarboxylic acid and dicarboxylic acid-based metal compounds, aromatic oxycarboxylic acids, aromatic mono- and poly-carboxylic acids and metal salts, anhydrides and esters thereof, phenol derivatives such as bisphenol, urea derivatives, metal-containing salicylic acid-based compounds, metal-containing naphthoic acid-based compounds, boron compounds, quaternary ammonium salts, calixarenes and charge control resins.

It is possible to use a polymer or copolymer having a sulfonic acid group, a sulfonic acid salt group or a sulfonic acid ester group as the charge control resin. It is particularly preferable for a polymer having a sulfonic acid group, a sulfonic acid salt group or a sulfonic acid ester group to contain a sulfonic acid group-containing acrylamide-based monomer or a sulfonic acid group-containing methacrylamide-based monomer at a copolymerization ratio of 2 mass % or more, and more preferably 5 mass % or more.

The charge control resin preferably has a glass transition temperature (Tg) of from 35° C. to 90° C., a peak molecular weight (Mp) of from 10,000 to 30,000, and a weight average molecular weight (Mw) of from 25,000 to 50,000. In a case where this is used, it is possible to impart preferred triboelectric charging characteristics without adversely affecting thermal characteristics required of the toner particle. Furthermore, if the charge control resin contains a sulfonic acid group, dispersibility of the charge control resin per se in the polymerizable monomer composition and dispersibility of the colorant and the like are improved, and tinting strength, transparency and triboelectric charging characteristics can be further improved.

It is possible to add one of these charge control agents or charge control resins in isolation, or a combination of two or more types thereof.

The added amount of the charge control agent or charge control resin is preferably from 0.01 parts by mass to 20.0 parts by mass, and more preferably from 0.5 parts by mass to 10.0 parts by mass, relative to 100.0 parts by mass of the binder resin.

Toner Particle Production Method

The toner particle preferably has a core particle that contains the binder resin and a shell on the surface of the core particle. The method for producing the toner particle is not particularly limited, and can be a well-known method, and it is possible to use a kneading pulverization method or a wet production method. A wet production method is preferred from the perspectives of particle diameter uniformity and shape control properties and readily obtaining a toner particle which has a core-shell structure. Examples of wet production methods include suspension polymerization methods, dissolution suspension methods, emulsion polymerizations and emulsion aggregation methods, and an emulsion aggregation method is more preferred from the perspective of facilitating control of hydrophilic properties at the surface of the toner.

In an emulsion aggregation method, dispersed solutions of materials such as fine particles of the binder resin and the colorant are first prepared. If necessary, dispersion stabilizers are added to the obtained dispersed solutions of these materials, and dispersed and mixed. Next, a flocculant is added so as to aggregate the dispersed solutions to a desired toner particle diameter, and resin fine particles are fused to each other during or after the aggregation. Toner particles are then formed by carrying out shape control using heat if necessary.

Here, fine particles of the binder resin can form composite particles formed from a plurality of layers comprising two or more layers of resins having different compositions. For example, the toner particle can be produced using an emulsion polymerization method, a mini-emulsion polymerization method, a phase inversion emulsification method, or the like, or by combining several of these methods. In a case where the toner particle contains an internal additive, the internal additive may be contained in resin fine particles, or is possible to separately prepare an internal additive fine particle-dispersed solution comprising only the internal additive and then carry out aggregation when the internal additive fine particles are aggregated with the resin fine particles. In addition, it is possible to carry out aggregation by adding resin fine particles having different compositions at different times during aggregation, thereby producing a toner particle having a configuration in which layers have different compositions. It is possible to aggregate resin fine particles containing the binder resin so as to form a core part and then carry out aggregation by adding resin fine particles containing a shell-forming resin at different times so as to form a shell part.

The shell-forming resin may be the same as, or different from, the binder resin. The added amount of the shell-forming resin (the shell content) is preferably 1.0 to 10.0 parts by mass, and more preferably 2.0 to 7.0 parts by mass, relative to 100 parts by mass of the binder resin contained in the core particles.

In this case, the toner production method preferably has the following steps.

(1) a dispersion step for preparing a dispersed solution of binder resin fine particles that contain the binder resin, (2) an aggregation step for aggregating binder resin fine particles contained in the dispersed solution of binder resin fine particles so as to form aggregates, (3) a shell formation step for further adding resin fine particles containing a shell-forming resin to the dispersed solution containing the aggregates, causing the resin fine particles to aggregate, and forming aggregates having a shell, and (4) a fusion step for heating and fusing the aggregates In addition, the toner production method preferably has (5) a heat sphering step for further increasing the temperature of the aggregates either during step (4) or after steps (1) to (4).

In addition, the toner production method more preferably has the following steps (6) and (7) after step (5).

(6) A cooling step for cooling the aggregates at a cooling rate of 0.1° C./sec or more (7) Following the cooling step, an annealing step for heating and holding the aggregates at a temperature that is not lower than the crystallization temperature or glass transition temperature of the binder resin Substances listed below can be used as dispersion stabilizers.

Well-known cationic surfactants, anionic surfactants and non-ionic surfactants can be used as surfactants.

Examples of inorganic dispersion stabilizers include tricalcium phosphate, magnesium phosphate, zinc phosphate, aluminum phosphate, calcium carbonate, magnesium carbonate, calcium hydroxide, magnesium hydroxide, aluminum hydroxide, calcium metasilicate, calcium sulfate, barium sulfate, bentonite, silica and alumina. In addition, examples of organic dispersion stabilizers include poly (vinyl alcohol), gelatin, methyl cellulose, methylhydroxypropyl cellulose, ethyl cellulose, sodium carboxymethyl cellulose and starch.

In addition to surfactants having the opposite polarity from surfactants used in the dispersion stabilizers mentioned above, inorganic salts and divalent or higher inorganic metal salts can be advantageously used as flocculants. Inorganic metal salts are particularly preferred from the perspectives of facilitating control of aggregation properties and toner charging performance due to polyvalent metal elements being ionized in aqueous media.

Specific examples of preferred inorganic metal salts include metal salts such as calcium chloride, calcium nitrate, barium chloride, magnesium chloride, zinc chloride, iron chloride, aluminum chloride and aluminum sulfate; and inorganic metal salt polymers such as iron polychloride, aluminum polychloride, aluminum polyhydroxide and calcium polysulfide. Of these, aluminum salts and polymers thereof are particularly preferred. In order to attain a sharper particle size distribution, it is generally preferable for the valency of an inorganic metal salt to be divalent rather than monovalent and trivalent or higher rather than divalent, and an inorganic metal salt polymer is more suitable for a given valency.

From the perspectives of high image precision and resolution, the volume-based median diameter of the toner particles is preferably from 3.0 μm to 10.0 μm.

Toner Production Method

The toner contains at least one type of external additive selected from the group consisting of fluorine-containing titania particles, fluorine-containing silica particles, fluorine-containing alumina particles, fluorine-containing titanium composite oxide particles and fluorine-containing hydrotalcite particles.

The mixing machine used for externally adding the external additive to the toner particle is not particularly limited, and it is possible to use a well-known mixing machine regardless of whether this is a wet mixer or a dry mixer. Examples thereof include an FM mixer (available from Nippon Coke and Engineering Co., Ltd.), a super mixer (available from Kawata Co., Ltd.), a Nobilta (available from Hosokawa Micron Corp.) or a Hybridizer (available from Nara Machinery Co., Ltd.). It is possible to prepare the toner by adjusting the speed of rotation of the external addition apparatus, the treatment time, the jacket water temperature or the amount of water in order to control the state of coverage of the external additive.

In addition, examples of classifying apparatuses able to be used for sieving out coarse particles following the external addition include an Ultrasonic (available from Koei Sangyo Co., Ltd.); a Rezona Sieve or Gyro Sifter (available from Tokuju Co., Ltd.); a Vibrasonic System (available from Dalton); a Soniclean (available from Sinto Kogyo); a Turbo Screener (available from Turbo Kogyo); and a Micron Sifter (available from Makino Mfg. Co., Ltd.).

Explanations will now be given of methods for measuring physical properties of the toner and materials.

Method for Identifying Fluorine-Containing Particles

Fluorine-containing particles, which are an external additive, can be identified by combining shape observations obtained using a scanning electron microscope (SEM) with elemental analysis using energy dispersive X-Ray analysis (EDS).

The toner is observed in a field of view magnified a maximum of 50,000 times using a S-4800 scanning electron microscope (produced by Hitachi, Ltd.). The microscope is focused on the toner particle surface, and the external additive to be identified is observed. It is possible to perform EDS analysis on the external additive to be identified and identify fluorine-containing particles from types of element peaks. An explanation will now be given using hydrotalcite particles as an example of fluorine-containing particles.

For the elemental peaks, if the elemental peak of at least one metal selected from the group consisting of the metals Mg, Zn, Ca, Ba, Ni, Sr, Cu and Fe that may constitute the hydrotalcite particle and the elemental peak of at least one metal selected from the group consisting of Al, B, Ga, Fe, Co and In are observed, the presence of a hydrotalcite particle containing these two metals can be deduced.

A standard sample of the hydrotalcite particle deduced from EDS analysis is prepared separately, and subjected to EDS analysis and SEM shape observation. A particle to be distinguished can be judged to be a hydrotalcite particle based on whether the analysis results for the standard sample match the analysis results for the particle to be distinguished.

Method for Measuring Element Ratios in Hydrotalcite Particles

Element ratios in hydrotalcite particles are measured by means of EDS mapping measurements of the toner using a scanning transmission electron microscope (STEM). In the EDS mapping measurements, each pixel in an analysis area has spectral data. By using a silicon drift detector having a large detection element area, EDS mapping measurements can be carried out with high sensitivity.

By performing statistical analysis on spectral data of pixels obtained using the EDS mapping measurements, it is possible to obtain primary component mapping in which pixels with similar spectra are extracted, and mapping of specific components is possible.

An observation sample is prepared using the following procedure.

A cylindrical toner pellet having a diameter of 8 mm and a thickness of approximately 1 mm is produced by weighing out 0.5 g of a toner and leaving to stand for 2 minutes under a load of 40 kN using a Newton Press in a cylindrical mold having a diameter of 8 mm. A flake having a thickness of 200 nm is produced from the toner pellet using an ultramicrotome (FC7 produced by Leica).

STEM-EDS mapping analysis is carried out using the following apparatus and conditions.

Scanning transmission electron microscope: JEM-2800 produced by JEOL Ltd.

EDS detector: JED-2300T produced by JEOL Ltd.; dry SD100GV detector (detection element area: 100 $mm^2$)

EDS analyzer: NORAN System 7 produced by Thermo Fisher Scientific

STEM-EDS Conditions

STEM accelerating voltage: 200 kV

Magnification ratio: 20,000 times

Probe size: 1 nm

STEM image size: 1024×1024 pixels (EDS elemental mapping images are obtained at the same location)

EDS mapping size: 256×256 pixels, dwell time: 30 μs, number of accumulations: 100 frames Calculations of element ratios in hydrotalcite particles are determined in the following way on the basis of multivariate analysis.

EDS mapping is obtained using the STEM-EDS analysis apparatus mentioned above. Next, acquired spectral mapping data is subjected to multivariate analysis using COMPASS (PCA) mode in the measurement command section of the NORAN System 7 mentioned above, and a primary component mapping image is extracted.

Preset values in this process are as follows.

Kernel size: 3×3

Quantification mapping setting: high (slow)

Filter fit type: high precision (slow)

The areal ratios of the extracted primary components in the EDS measurement field of view are calculated at the same time using this procedure. Obtained EDS spectra in the primary component mapping is subjected to quantitative analysis using the Cliff-Lorimer method.

A toner particle portion and a hydrotalcite particle are differentiated on the basis of the quantitative analysis results of the obtained STEM-EDS primary component mapping. Said particle can be identified as a hydrotalcite particle from the particle size, the particle shape, the content of polyvalent metals such as aluminum and magnesium, and the quantity ratio thereof.

In addition, the presence of fluorine and aluminum in the inner part of the hydrotalcite particle is confirmed using the means described below.

Method for Analyzing Fluorine and Aluminum in Fluorine-Containing Hydrotalcite Particles Fluorine and aluminum in the hydrotalcite particles are analyzed on the basis of mapping data derived from STEM-EDS mapping analysis obtained using the method described above. Specifically, fluorine and aluminum present in the inner part of the particle are analyzed by carrying out EDS line analysis in a normal direction relative to the periphery of the hydrotalcite particle.

Figure 2A:
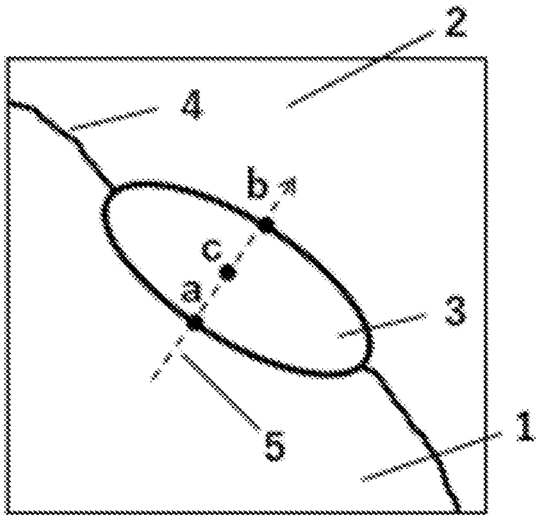
FIGS. 2A to 2C are a set of schematic diagrams of EDS line analysis in STEM-EDS mapping analysis.

FIG. 2A shows a schematic diagram of line analysis. For a hydrotalcite particle 3 adjacent to a toner particle 1 and a toner particle 2, line analysis is carried out in a normal direction relative to the periphery of the hydrotalcite particle 3, that is, in the direction of the arrow on the dotted line 5. Moreover, 4 indicates the boundary between the toner particles.

An area in which a hydrotalcite particle is present in the acquired STEM image is selected using a rectangular selection tool, and line analysis is carried out using the following conditions.

Line Analysis Conditions

STEM magnification ratio: 800,000 times

Line length: 200 nm

Line width: 30 nm

Number of line divisions: 100 (intensity measured every 2 nm)

In a case where the element peak intensity of fluorine or aluminum is at least 1.5 times the background intensity in an EDS spectrum of a hydrotalcite particle, and in a case where the element peak intensity of fluorine or aluminum at both edges of a hydrotalcite particle (points a and b in FIG. 2A) in the line analysis is not more than 3.0 times the peak intensity at point c, it is assessed that the element in question is contained in the inner part of the hydrotalcite particle. Moreover, point c is the midpoint on the line a-b (that is, the midpoint between both edges of the particle).

Figure 2B:
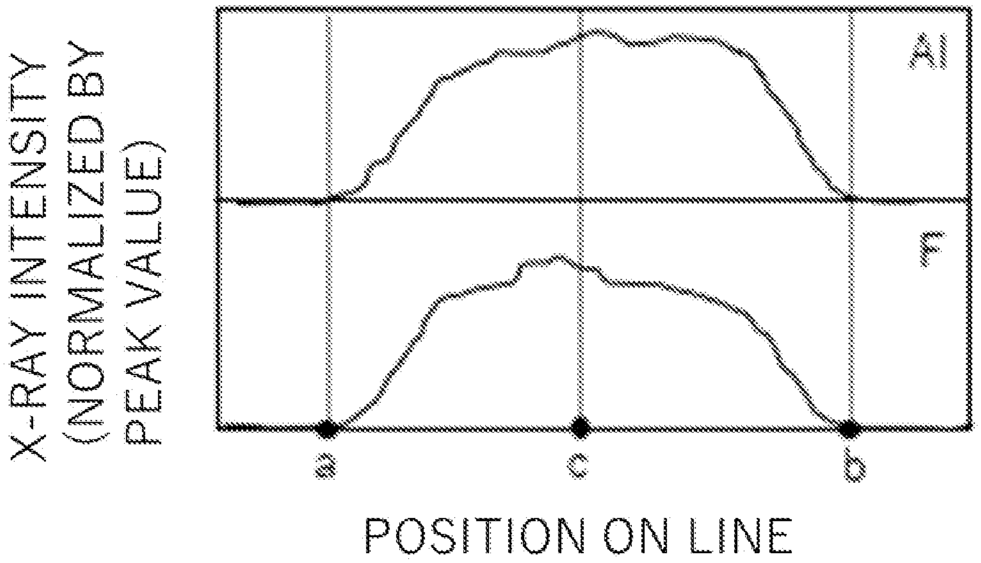
Figure 2C:
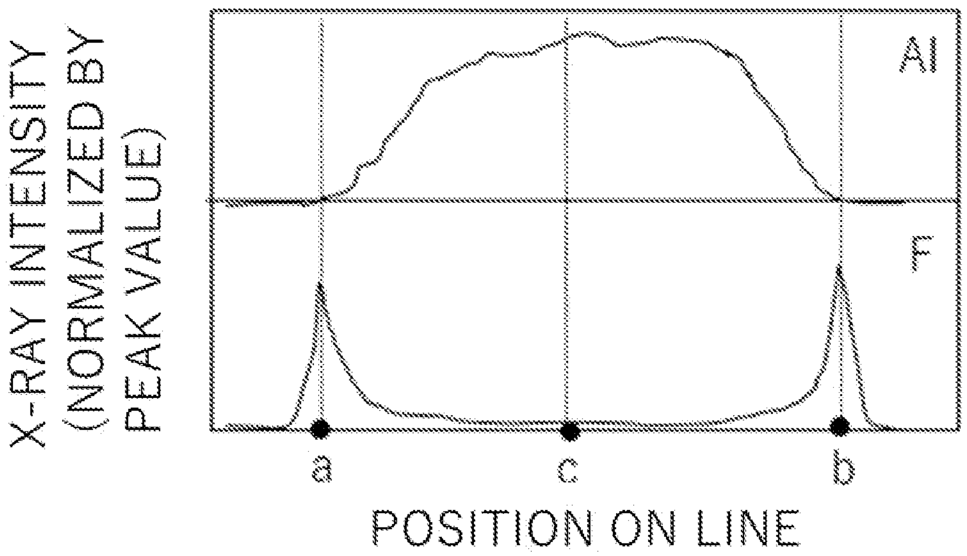

Examples of X-Ray intensities of fluorine and aluminum obtained using line analysis are shown in FIG. 2B and FIG. 2C. In a case where the inner part of a hydrotalcite particle contains fluorine and aluminum, a graph of X-Ray intensity normalized by peak intensity has a shape such as that shown in FIG. 2B. In a case where a hydrotalcite particle contains fluorine derived from a surface treatment agent, a graph of X-Ray intensity normalized by peak intensity has peaks in the vicinity of the edges a and b in the graph for fluorine, as shown in FIG. 2C. By confirming X-Ray intensities derived from fluorine and aluminum in the line analysis, it is possible to confirm that the inner part of the hydrotalcite particle contains fluorine and aluminum.

Method for Calculating Concentration Ratio of Number of Fluorine Atoms Relative to Aluminum Atoms (F/Al Element Ratio) in Fluorine-Containing Hydrotalcite Particles The concentration ratio of the number of fluorine atoms relative to aluminum atoms (F/Al) in the hydrotalcite particles, as determined by primary component mapping derived from fluorine-containing hydrotalcite particles in the STEM-EDS mapping analysis described above, is acquired for multiple fields of view, and by determining the arithmetic mean value for 100 or more of said particles, the concentration ratio of the number of fluorine atoms relative to aluminum atoms (F/Al) in the fluorine-containing hydrotalcite particles is determined.

Method for Calculating Concentration Ratio of Number of Magnesium Atoms Relative to Aluminum Atoms (Mg/Al Element Ratio) in Fluorine-Containing Hydrotalcite Particles The concentration ratio of the number of magnesium atoms relative to aluminum atoms (Mg/Al element ratio) in hydrotalcite particles is calculated using a method similar to the method described above for calculating the concentration ratio of the number of fluorine atoms relative to aluminum atoms (F/Al) in hydrotalcite particles.

Method for Calculating Areal Ratio of the Fluorine-Containing Particles

Relative to Toner Particle

The areal ratio of extracted primary components in an EDS measurement field of view can be calculated on the basis of mapping data derived from STEM-EDS mapping analysis of the toner, which is obtained using the method described above. A value in which "the area of fluorine-containing particles" is taken to be the numerator and "the sum of the area of the fluorine-containing particles and the area of the toner particle" is taken to be the denominator is calculated as the areal ratio of the fluorine-containing particles relative to the toner particle.

This mapping data is acquired for multiple fields of view, and the areal ratio of the fluorine-containing particles relative to the toner particle in an EDS measurement field of view is calculated. The arithmetic mean for 30 fields of view is taken to be the areal ratio of the fluorine-containing particles relative to the toner particle.

Method for Measuring Fixing Ratio of Fluorine-Containing Particles

First, two types of sample (a toner before washing with water and a toner after washing with water) are prepared.

(i) Toner before washing with water: A toner produced in a working examples given below is used as-is.

(ii) Toner after washing with water: A concentrated sucrose solution is prepared by adding 160 g of sucrose (produced by Kishida Chemical Co., Ltd.) to 100 mL of ion exchanged water and dissolving the sucrose while heating over hot water. A dispersed solution is prepared by placing 31 g of the concentrated sucrose solution and 6 mL of Contaminon N (a 10 mass % aqueous solution of a neutral detergent for cleaning precision measurement equipment, which has a pH of 7 and comprises a non-ionic surfactant, an anionic surfactant and an organic builder, produced by Wako Pure Chemical Industries, Ltd.) in a centrifugal separation tube. 1 g of toner is added to this dispersed solution and lumps of the toner are broken into smaller pieces using a spatula or the like. The centrifugal separation tube is shaken for 20 minutes using a shaker at a speed of 5.8 $s^{-1}$.

Following the shaking, the solution is transferred to a (50 mL) swing rotor glass tube and subjected to centrifugal separation for 30 minutes at a speed of 58.3 $s^{-1}$ using a centrifugal separator. It is confirmed by visual inspection that the toner is sufficiently separated from the aqueous solution, and the toner separated into the uppermost layer is collected using a spatula or the like. A sample is obtained by filtering the obtained toner-containing aqueous solution using a vacuum filtration device and then drying for 1 hour or longer using a dryer.

These samples before washing with water and after washing with water are subjected to SEM/EDS observations under the following conditions in a field of view aligned with the center of 20 randomly selected toners, and the sum total of the areas of the fluorine-containing particles is calculated. The fixing ratio of fluorine-containing particles is calculated using the following formula.

Fixing ratio of fluorine-containing particles (%)=(sum total of areas of fluorine-containing particles in toner after washing with water)/(sum total of areas of fluorine-containing particles in toner before washing with water)×100

The SEM/EDS apparatus and observation conditions are as follows.

Apparatus used (SEM): ULTRA PLUS produced by Carl Zeiss Microscopy

Apparatus used (EDS): NORAN System 7 produced by Thermo Fisher Scientific, Ultra Dry EDS Detector Accelerating voltage: 5.0 kV WD: 7.0 mm Aperture Size: 30.0 μm Detection signal: SE2 (secondary electrons)

Magnification ratio: 50,000 times

Mode: Spectral Imaging

Pretreatment: a sample toner is sprayed onto a carbon tape and sputtered with platinum.

Method for Measuring Number Average Particle Diameter of Primary Particles of Silica Particles and Hydrotalcite Particles The number average particle diameter of external additives such as silica particles and hydrotalcite particles is measured by combining elemental analysis obtained from an "S-4800" scanning electron microscope (produced by Hitachi, Ltd.) with energy dispersive X-Ray analysis (EDS). A toner to which the external additive has been externally added is observed, and the external additive is photographed in a field of view at a maximum magnification rate of 200,000 times. Silica particles or hydrotalcite particles are selected from photographed images, the lengths of primary particles of 100 silica particles or hydrotalcite particles selected at random are measured, and the number average particle diameter is determined. The magnification ratio is adjusted as appropriate according to the size of the external additive. Here, particles able to be seen as single particles in observations are assessed as being primary particles. In a case where an external additive per se can be procured as a sample, the external additive can be observed directly.

Method for Measuring Particle Diameter, Such as Volume-Based Median Diameter, of Toner The particle diameter such as volume-based median diameter of the toner is calculated as follows. A "Multisizer 3 Coulter Counter" precise particle size distribution analyzer (registered trademark, Beckman Coulter, Inc.) based on the pore electrical resistance method and equipped with a 100 μm aperture tube is used as the measurement unit together with the accessory dedicated "Beckman Coulter Multisizer 3 Version 3.51" software (Beckman Coulter, Inc.) for setting the measurement conditions and analyzing the measurement data. Measurement is performed with 25,000 effective measurement channels.

The aqueous electrolytic solution used in measurement may be a solution of special grade sodium chloride dissolved in ion-exchanged water to a concentration of about 1 mass %, such as "ISOTON II" (Beckman Coulter, Inc.) for example.

The following settings are performed on the dedicated software prior to measurement and analysis.

On the "Change standard measurement method (SOMME)" screen of the dedicated software, the total count number in control mode is set to 50,000 particles, the number of measurements to 1, and the Kd value to a value obtained with "Standard particles 10.0 μm" (Beckman Coulter, Inc.). The threshold and noise level are set automatically by pushing the "Threshold/noise level measurement" button. The current is set to 1600 μA, the gain to 2, and the electrolytic solution to ISOTON II, and a check is entered for "Aperture tube flush after measurement".

On the "Conversion settings from pulse to particle diameter" screen of the dedicated software, the bin interval is set to the logarithmic particle diameter, the particle diameter bins to 256, and the particle diameter range to 2 to 60 μm.

The specific measurement methods are as follows.

(1) About 200 mL of the aqueous electrolytic solution is placed in a glass 250 mL round-bottomed beaker dedicated to the Multisizer 3, the beaker is set on the sample stand, and stirring is performed with a stirrer rod counter-clockwise at a rate of 24 rps. Contamination and bubbles in the aperture tube are then removed by the "Aperture tube flush" function of the dedicated software.

(2) 30 mL of the same aqueous electrolytic solution is placed in a glass 100 mL flat-bottomed beaker, and about 0.3 mL of a dilution of "Contaminon N" (a 10 mass % aqueous solution of a pH 7 neutral detergent for washing precision instruments, comprising a nonionic surfactant, an anionic surfactant, and an organic builder, manufactured by Wako Pure Chemical Industries, Ltd.) diluted about three times by mass with ion-exchange water is added.

(3) An ultrasonic disperser "Ultrasonic Dispersion System Tetra150" (Nikkaki Bios Co., Ltd.) with an electrical output of 120 W equipped with two built-in oscillators having an oscillating frequency of 50 kHz with their phases shifted by 1800 from each other is prepared. About 3.3 L of ion-exchange water is added to the water tank of the ultrasonic disperser, and about 2 mL of Contaminon N is added to the tank.

(4) The beaker of (2) above is set in the beaker-fixing hole of the ultrasonic disperser, and the ultrasonic disperser is operated. The height position of the beaker is adjusted so as to maximize the resonant condition of the liquid surface of the aqueous electrolytic solution in the beaker.

(5) The aqueous electrolytic solution in the beaker of (4) above is exposed to ultrasound as about 10 mg of toner is added bit by bit to the aqueous electrolytic solution, and dispersed. Ultrasound dispersion is then continued for a further 60 seconds. During ultrasound dispersion, the water temperature in the tank is adjusted appropriately to from 10° C. to 40° C.

(6) The aqueous electrolytic solution of (5) above with the toner dispersed therein is dripped with a pipette into the round-bottomed beaker of (1) above set on the sample stand, and adjusted to a measurement concentration of about 5%. Measurement is then performed until the number of measured particles reaches 50000.

(7) The volume-based median diameter is calculated by analyzing measurement data using the accompanying dedicated software.

Compositional Analysis of Binder Resin

Method for Separating Binder Resin from Toner 100 mg of a toner is dissolved in 3 mL of chloroform. Next, insoluble components are removed by subjecting the obtained solution to suction filtration using a syringe equipped with a sample treatment filter (having a pore size of from 0.2 μm to 0.5 μm, for example a Mishoridisk H-25-2 produced by Tosoh Corporation). Soluble components are introduced into a preparative HPLC apparatus (LC-9130 NEXT produced by Japan Analytical Industry Co., Ltd., preparative columns [60 cm], exclusion limits: 20000 and 70000, 2 linked columns), and a chloroform eluant is flushed through the columns. If a peak shown on the obtained chromatograph can be confirmed, a retention time corresponding to a molecular weight of 2000 or more is fractionated with a monodispersed polystyrene standard sample. A binder resin is obtained by drying/solidifying the solution of the obtained fraction.

Identification of Binder Resin Components and Measurement of Mass Ratio by Nuclear Magnetic Resonance (NMR)

1 mL of deuterated chloroform is added to 20 mg of a toner, and a proton NMR spectrum is measured for the dissolved binder resin. Molar ratios and mass ratios of monomers are calculated from the obtained NMR spectrum, and the content values of constituent monomer units in the binder resin, such as a styrene acrylic resin, can be determined. For example, in the case of a styrene-acrylic copolymer, compositional ratios and mass ratios can be calculated from a peak in the vicinity of 6.5 ppm, which is derived from styrene monomer, and a peak derived from an acrylic monomer in the vicinity of 3.5 to 4.0 ppm. In addition, in the case of a copolymer of a polyester resin and a styrene acrylic resin, molar ratios and mass ratios are calculated from peaks derived from monomers that constitute the polyester resin and peaks derived from the styrene-acrylic copolymer.

NMR apparatus: JEOL RESONANCE ECX500

Observation nuclei: protons, measurement mode: single pulse, reference peak: TMS Measurement of Weight Average Molecular Weight Mw, Number Average Molecular Weight Mn and Peak Molecular Weight The molecular weight distribution (weight average molecular weight Mw, number average molecular weight Mn and peak molecular weight) of a resin or the like is measured by means of gel permeation chromatography (GPC), in the manner described below.

First, a sample is dissolved in tetrahydrofuran (TIF) at room temperature over a period of 24 hours. A sample solution is then obtained by filtering the obtained solution using a solvent-resistant membrane filter having a pore diameter of 0.2 μm (a "Mishoridisk" produced by Tosoh Corporation). Moreover, the sample solution is adjusted so that the concentration of TiF-soluble components is 0.8 mass %. Measurements are carried out using this sample solution under the following conditions.

Apparatus: HLC8120 GPC (detector: RI) (available from Tosoh Corporation)

Column: Combination of seven Shodex columns (KF-801, 802, 803, 804, 805, 806 and 807 produced by Showa Denko Kabushiki Kaisha)

Eluant: Tetrahydrofuran (TIF)

Flow rate: 1.0 mL/min

Oven temperature: 40.0° C.

Injected amount: 0.10 mL

When calculating the molecular weight of the sample, a molecular weight calibration curve is prepared using standard polystyrene resins (for example, the products "TSK Standard Polystyrene F-850, F-450, F-288, F-128, F-80, F-40, F-20, F-10, F-4, F-2, F-1, A-5000, A-2500, A-1000 and A-500", produced by Tosoh Corporation).

Method for Wettability Test in Mixed Methanol/Water Solvent

In a wettability test of the toner in a mixed methanol/water solvent, measurements are carried out using the conditions and procedure described below using a powder wettability tester ("WET-100P" produced by Rhesca Co., Ltd.), and wettability is calculated from an obtained methanol dropping transmittance curve.

A fluororesin-coated spindle-like rotor having a length of 25 mm and a maximum body diameter of 8 mm is placed in a cylindrical glass container having a diameter of 5 cm and a thickness of 1.75 mm. 60 mL of water that has been treated with a reverse osmosis membrane (RO water) is placed in the cylindrical glass container, and dispersion is carried out for 5 minutes using an ultrasonic disperser in order to remove air bubbles and the like. 0.1 g of a toner is precisely weighed out and added to the container to prepare a measurement sample liquid.

While stirring the spindle-like rotor in the cylindrical glass container at a speed of 300 rpm using a magnetic stirrer, methanol is continuously added to the measurement sample liquid at a dropping speed of 0.8 mL/min through the powder wettability tester. The transmittance of light having a wavelength of 780 nm is measured, and a methanol dropping transmittance curve such as that shown in FIG. 1 is prepared. The methanol concentration (TA) at which a transmittance of 50% is exhibited is read from the methanol dropping transmittance curve.

Moreover, the methanol concentration (TA; vol %) is calculated using the formula below.

Methanol concentration (vol %)=(volume of methanol present in cylindrical glass container/volume of mixture of methanol and water present in cylindrical glass container)×100

Loss on Heating of External Additive

The loss on heating is measured using a TGA7 thermal analysis apparatus produced by PerkinElmer Co., Ltd. The external additive is heated from normal temperature to 500° C. at a temperature increase rate of 25° C./min in a nitrogen atmosphere, and the reduction in mass from 200° C. to 400° C. is taken to be the loss on heating of the external additive.

If the external additive used for the external addition can be procured, measurements should be carried out using this. In cases where an external additive that has been separated from the toner particle surface is to be used as a measurement sample, the external additive is separated from the toner particle using the following procedure.

A concentrated sucrose solution is prepared by adding 160 g of sucrose (available from Kishida Chemical Co., Ltd.) to 100 mL of ion exchanged water and dissolving the sucrose while immersing in hot water. A dispersed solution is prepared by placing 31 g of the concentrated sucrose solution and 6 mL of Contaminon N in a centrifugal separation tube. 1 g of toner is added to this dispersed solution and lumps of the toner are broken into smaller pieces using a spatula or the like.

The centrifugal separation tube is shaken for 20 minutes in the shaker described above at a rate of 350 reciprocations per minute. Following the shaking, the solution is transferred to a (50 mL) swing rotor glass tube and subjected to centrifugal separation for 30 minutes at a rate of 58.33 $s^{-1}$ using a centrifugal separator (H-9R, available from Kokusan Co., Ltd.). The toner is present in the uppermost layer and the external additive is present in the aqueous solution side of the lower layer in the glass tube following the centrifugal separation. The aqueous solution in the lower layer is collected and subjected to centrifugal separation so as to separate sucrose from the external additive, and the external additive is collected. If necessary, the centrifugal separation is repeated, and once sufficient separation has been achieved, the dispersed solution is dried and the external additive is collected.

In a case where a plurality of external additives are used, the target external additive should be sorted from the collected external additives using a centrifugal separation method or the like.

EXAMPLES

The present invention will now be explained in further detail by means of production examples and working examples, but these examples in no way limit the present invention. Moreover, numbers of parts in the formulations shown below indicate parts by mass.

Production of Hydrotalcite Particles 7

Hydrotalcite particles 7 were produced using a method disclosed in Japanese Patent Application Publication No. S55-028750 and International Publication No. 2013/147284. Specifically, hydrotalcite particles 7 were produced in the manner described below.

A mixed aqueous solution (solution A) containing 1.03 mol/L of magnesium chloride and 0.239 mol/L of aluminum sulfate, an aqueous solution containing 0.753 mol/L of sodium carbonate (solution B) and an aqueous solution containing 3.39 mol/L of sodium hydroxide (solution C) were prepared.

Next, solution A, solution B and solution C were injected into a reaction tank at a solution A: solution B volume ratio of 4.5:1 using metering pumps, the pH of the reaction liquid was held between the range 9.3 to 9.6 using solution C, and a reaction was carried out at a temperature of 40° C. to produce a precipitate. The precipitate was filtered, washed and re-emulsified with ion exchanged water to obtain a raw material hydrotalcite slurry. The concentration of hydrotalcite in the obtained hydrotalcite slurry was 5.6 mass %.

The obtained hydrotalcite slurry was dried overnight at 40° C. A solution was prepared by dissolving NaF in ion exchanged water at a concentration of 100 mg/L and adjusting the pH to 7.0 using 1 mol/L HCl or 1 mol/L NaOH, and the dried hydrotalcite was added to this solution at a concentration of 0.1% (w/v %). Using a magnetic stirrer, stirring was carried out at a fixed speed for 48 hours so that precipitation did not occur. The solution was then filtered using a membrane filter having a pore diameter of 0.5 μm, and then washed with ion exchanged water. The obtained hydrotalcite was dried overnight at 40° C. and then deagglomerated. The composition and physical properties of the obtained hydrotalcite particles 7 are shown in Table 1.

Production of Hydrotalcite Particles 1 to 6

Hydrotalcite particles 1 to 6 were obtained in the same way as in the production example of hydrotalcite particles 7, except that the concentrations of solution A, solution B and the aqueous solution of NaF were conveniently adjusted.

The composition and physical properties of the obtained hydrotalcite particles 1 to 6 are shown in Table 1.

TABLE 1

| Hydrotalcite particles No. | Mg/Al ratio | Position of F | F/Al ratio | Number average particle diameter (nm) |
|---|---|---|---|---|
| 1 | 4.5 | Inner part | 0.65 | 60 |
| 2 | 4.5 | Inner part | 0.60 | 1000 |
| 3 | 4.0 | Inner part | 0.30 | 100 |
| 4 | 4.5 | Inner part | 0.20 | 800 |
| 5 | 1.5 | Inner part | 0.01 | 400 |
| 6 | 1.3 | Inner part | 0.02 | 400 |

TABLE 1-continued

| Hydrotalcite particles No. | Mg/Al ratio | Position of F | F/Al ratio | Number average particle diameter (nm) |
|---|---|---|---|---|
| 7 | 2.8 | Inner part | 0.10 | 400 |

"Number average particle diameter" is the number average particle diameter of primary particles.

Production of Titania Particles 1

An ilmenite ore was dried and pulverized, and then digested/extracted by being treated with concentrated sulfuric acid. Unreacted ore was removed, and iron sulfate was then decrystallized. An aqueous solution of sodium hydroxide was added to the obtained titanyl sulfate to attain a pH of 9.0, desulfurization was carried out, neutralization was carried out to a pH of 5.8 using hydrochloric acid, and the obtained liquid was then filtered and washed with water. A dried product obtained by drying for 5 hours at 150° C. was dispersed in toluene and then deagglomerated using an NVM-2 type bead mill (produced by Imex) and beads having diameters of 0.5 mm.

The average particle diameter of the toluene dispersion solution of titania particles was measured using a Microtrac UPA-150 (produced by Nikkiso Co., Ltd.), and found to be 0.090 μm.

An ethanol solution of trifluoropropyltrimethoxysilane was added so that the concentration of trifluoropropyltrimethoxysilane was 3% relative to the solids content of the titania particles, heated to 60° C. using an oil bath while stirring at 100 rpm, and allowed to react for 8 hours, after which the solvent was evaporated off while increasing the temperature to 150° C., and the residue was fired for further 6 hours to obtain titania particles 1.

Production of Titania Particles 2 Titania particles 2 were obtained using a method similar to that used in the production of titania particles 1, except that the amount of trifluoropropyltrimethoxysilane was changed from 3% to 1%.

Production Example of Strontium Titanate Particles 1

An ilmenite ore was dried and pulverized, and then digested/extracted by being treated with concentrated sulfuric acid. Unreacted ore was removed, and iron sulfate was then decrystallized. An aqueous solution of sodium hydroxide was added to the obtained titanyl sulfate to attain a pH of 9.0, desulfurization was carried out, neutralization was carried out to a pH of 5.8 using hydrochloric acid, and the obtained liquid was then filtered and washed with water. Water was added to the washed cake so as to obtain a slurry containing 1.5 mol/L of $TiO_2$, after which the pH was adjusted to 1.5 by means of hydrochloric acid, and a deflocculation treatment was carried out.

Desulfurized and deflocculated meta-titanic acid was obtained as $TiO_2$ and placed in a 3 L reaction vessel. An aqueous solution of strontium chloride was added to the deflocculated meta-titanic acid slurry so that the $SrO/TiO_2$ molar ratio was 1.18, and the $TiO_2$ concentration was then adjusted to 0.9 mol/L. Next, the temperature was increased to 90° C. while stirring and mixing, 444 mL of a 10 N aqueous solution of sodium hydroxide was added over a period of 50 minutes while microbubbling nitrogen gas at a rate of 600 mL/min, and stirring was then carried out at 95° C. for a further 1 hour while microbubbling nitrogen gas at a rate of 400 mL/min.

Next, this reaction slurry was stirred and cooled to 12° C. while circulating cooling water at 10° C. in a jacket of the reaction vessel, neutralized through addition of hydrochloric acid, stirred for 1 hour, and then filtered/separated. A dried product obtained by drying for 5 hours at 150° C. was dispersed in toluene and then deagglomerated using an NVM-2 type bead mill (produced by Imex) and beads having diameters of 0.5 mm.

The average particle diameter of the toluene dispersion solution of strontium titanate particles was measured using a Microtrac UPA-150 (produced by Nikkiso Co., Ltd.), and found to be 0.081 μm.

An ethanol solution of trifluoropropyltrimethoxysilane was added so that the concentration of trifluoropropyltrimethoxysilane was 3% relative to the solids content of the strontium titanate particles, heated to 60° C. using an oil bath while stirring at 100 rpm, and allowed to react for 8 hours, after which the solvent was evaporated off while increasing the temperature to 150° C., and the residue was fired for further 6 hours to obtain strontium titanate particles 1.

Production Example of Alumina Particles 1

Bauxite was used as a raw material, and aluminum oxide was purified using the Bayer process. Sodium hydroxide was added to bauxite and dissolved by being heated at 250° C. After removing insoluble components by filtration, the mixture was cooled and aluminum hydroxide was recovered as a solid. This aluminum hydroxide was heated and dehydrated at 1050° C. to obtain alumina particles. The alumina particles were dispersed in toluene and then deagglomerated using an NVM-2 type bead mill (produced by Imex) and beads having diameters of 0.5 mm.

The average particle diameter of the toluene dispersion solution of alumina particles was measured using a Microtrac UPA-150 (produced by Nikkiso Co., Ltd.), and found to be 0.081 μm.

An ethanol solution of trifluoropropyltrimethoxysilane was added so that the concentration of trifluoropropyltrimethoxysilane was 3% relative to the solids content of the alumina particles, heated to 60° C. using an oil bath while stirring at 100 rpm, and allowed to react for 8 hours, after which the solvent was evaporated off while increasing the temperature to 150° C., and the residue was fired for further 6 hours to obtain alumina particles 1.

Production Example of Silica Particles 1

A mixed gas comprising argon and oxygen at a volume ratio of 3:1 was introduced into a reaction vessel to purge air. This reaction vessel was supplied with oxygen gas at a rate of 40 ($m^3$/hr) and hydrogen gas at a rate of 20 ($m^3$/hr), and a combustion flame comprising oxygen and hydrogen was formed using an ignition device. Next, a dust cloud was formed by injecting a metallic silicon powder into this combustion flame using a hydrogen carrier gas at a pressure of 147 kPa (1.5 kg/$cm^2$). This dust cloud was ignited by the combustion flame, and an oxidation reaction was brought about by the dust explosion. Following the oxidation reaction, the inside of the reaction vessel was cooled to obtain silica particles. The alumina particles were dispersed in toluene and then deagglomerated using an NVM-2 type bead mill (produced by Imex) and beads having diameters of 0.5 mm.

The average particle diameter of the toluene dispersion solution of silica particles was measured using a Microtrac UPA-150 (produced by Nikkiso Co., Ltd.), and found to be 0.077 μm.

An ethanol solution of trifluoropropyltrimethoxysilane was added so that the concentration of trifluoropropyltrimethoxysilane was 3% relative to the solids content of the silica particles, heated to 60° C. using an oil bath while stirring at 100 rpm, and allowed to react for 8 hours, after which the solvent was evaporated off while increasing the temperature to 150° C., and the residue was fired for further 6 hours to obtain silica particles 1.

Production Example of Silica Particles 2

360.0 parts of water was placed in a reaction vessel equipped with a temperature gauge and a stirrer, and 15.0 parts of hydrochloric acid having a concentration of 5.0 mass % was added thereto to form a homogeneous solution. A solution 1 was obtained by adding 208.0 parts of tetraethoxysilane to this homogeneous solution while stirring at 25° C., and then stirring for 5 hours.

Next, 440.0 parts of water was placed in a reaction vessel equipped with a temperature gauge, a stirrer and a dropping device, and 17.0 parts of aqueous ammonia having a concentration of 10.0 mass % was added thereto to form a homogeneous solution. A suspension was obtained by adding this homogeneous solution dropwise to the solution mentioned above at a ratio of 1:100 over a period of 0.4 hours while stirring at 30° C. (the reaction temperature), and then stirring for 6 hours (the reaction time). Silica particles 2 were then obtained by supplying the obtained suspension to a centrifugal separator so as to precipitate and extract fine particles, drying for 24 hours using a dryer at a temperature of 150° C., and adjusting the temperature and time in the dryer so as to attain a desired TGA loss on heating. Physical properties are shown in Table 2.

Production Examples of Silica Particles 3 to 6

Silica particles 3 to 6 were obtained using the same method as that used in the production example of silica particles 2, except that the conditions in Table 2 were altered. Physical properties are shown in Table 2.

Physical properties of the obtained silica particles are shown in Table 2.

TABLE 2

| Silica particles No. | Reaction temperature (° C.) | Reaction time (hours) | TGA loss on heating adjustment temperature (° C.) | TGA loss on heating adjustment time (hours) | Particle diameter (nm) | TGA loss on heating (%) |
|---|---|---|---|---|---|---|
| 2 | 35 | 1.5 | None | | 100 | 9 |
| 3 | 30 | 5 | 200 | 2 | 150 | 0.3 |
| 4 | 35 | 2 | None | | 100 | 8 |
| 5 | 35 | 5 | 200 | 1 | 100 | 0.5 |
| 6 | 35 | 5 | None | | 100 | 4 |

"Particle diameter" is the number average particle diameter of primary particles.

Production Example of Toner 1

Preparation Example of Resin Particle-Dispersed Solution 1

Styrene: 75.0 parts

Butyl acrylate: 23.7 parts

Acrylic acid: 1.3 parts n-laurylmercaptan: 3.2 parts

The materials listed above were placed in a container and mixed by being stirred. An aqueous solution of 1.5 parts of Neogen RK (produced by Dai-ichi Kogyo Seiyaku Co., Ltd.) in 150.0 parts of ion exchanged water was added to this solution and dispersed.

While stirring gently for a further 10 minutes, an aqueous solution of 0.3 parts of potassium persulfate in 10.0 parts of ion exchanged water was added. After purging with nitrogen, emulsion polymerization was carried out for 6 hours at 70° C. Following completion of the polymerization, the reaction liquid was cooled to room temperature and ion exchanged water was added, thereby obtaining a resin particle-dispersed solution 1 having a solid content concentration of 12.5 mass %, a volume-based median diameter of 0.2 μm and a glass transition temperature of 56° C.

Preparation Example of Release Agent-Dispersed Solution 1

Release agent-dispersed solution 1 was obtained by mixing 100.0 parts of behenyl behenate (melting point: 72.1° C.) and 15.0 parts of Neogen RK with 385.0 parts of ion exchanged water and dispersing for approximately 1 hour using a wet jet mill (JN100 produced by Jokoh Co., Ltd.). The wax concentration in release agent-dispersed solution 1 was 20.0 mass %.

Preparation Example of Colorant-Dispersed Solution 1

Colorant-dispersed solution 1 was obtained by mixing 50.0 parts of copper phthalocyanine (Pigment Blue 15:3) as a colorant and 5.0 parts of Neogen RK with 200.0 parts of ion exchanged water and dispersing for approximately 1 hour using a JN100 wet jet mill. The solid content concentration in colorant-dispersed solution 1 was 20.0 mass %.

Preparation of Toner Particle 1

Resin particle-dispersed solution 1: 265.0 parts

Release agent particle-dispersed solution 1: 20.0 parts

Colorant particle-dispersed solution 1: 8.0 parts

As a core formation step, the materials listed above were placed in a round stainless steel flask and mixed. Next, the obtained mixed solution was dispersed for 10 minutes at 5000 rpm using a homogenizer (an Ultratarax T50 produced by IKA). While stirring, the temperature inside the vessel was adjusted to 30° C., and a 1 mol/L aqueous solution of sodium hydroxide was added to adjust the pH to 8.0.

As a flocculant, an aqueous solution obtained by dissolving 0.25 parts of aluminum chloride in 10.0 parts of ion exchanged water was added over a period of 10 minutes at 30° C. while stirring. After leaving the obtained mixture to stand for 3 minutes, a temperature increase was initiated, the temperature was increased to 60° C., and aggregated particles were produced (core formation). The volume-based median diameter of the formed aggregated particles was conveniently confirmed using a "Coulter Counter Multisizer 3" (registered trademark, produced by Beckman Coulter, Inc.). At the point where the volume-based median diameter was 7.0 μm, a shell was formed by introducing 15.0 parts of resin particle-dispersed solution 1 and stirring for 1 hour as a shell formation step.

Next, a 1 mol/L aqueous solution of sodium hydroxide was added to adjust the pH to 9.0, the temperature was increased to 95° C., and the aggregated particles were spheroidized. When an average circularity of 0.980 was achieved, a temperature decrease was initiated, and the obtained mixture was cooled to room temperature, thereby obtaining toner particle-dispersed solution 1.

Hydrochloric acid was added to the obtained toner particle-dispersed solution 1 to adjust the pH to 1.5 or less, the solution was left to stand for 1 hour, and solid-liquid separation was then carried out using a pressure filter to obtain a toner cake. A slurry was formed from this toner cake using ion exchanged water so as to again form a dispersed solution, and solid-liquid separation was carried out using the filter mentioned above. The re-slurrying and solid-liquid separation were repeated until the electrical conductivity of the filtrate reached 5.0 μS/cm or less, and a final solid-liquid separation was carried out to obtain a toner cake. Toner particle 1 was obtained by drying the obtained toner cake and then classified using a classifier so that the volume-based median diameter was 7.0 μm.

Production Example of Toner 1

(0.3 parts of) silica particles 1 as fluorine-containing external additive 1 and (1.5 parts of) silica particles 2 as external additive 2 were externally mixed with (100.0 parts of) the obtained toner particle 1 using a FM10C (produced by Nippon Coke and Engineering Co., Ltd.). External addition conditions were such that the lower blade was an A0 blade, the distance from the deflector wall was 20 mm, the charged amount of toner particles was 2.0 kg, the speed of rotation was 66.6 $s^{-1}$, the external addition time was 10 minutes, the temperature of cooling water was 20° C., and the flow rate of cooling water was 10 L/min.

Toner 1 was obtained by sieving through a mesh having an opening size of 200 μm. Physical properties of obtained toner 1 are shown in Table 4.

Production Examples of Toners 2 to 14 Toners 2 to 14 were obtained in the same way as in the production example of toner 1, except that external addition conditions were altered as shown in Table 3. Physical properties of obtained toners 2 to 14 are shown in Table 4.

Production Example of Comparative Toners 1 to 3

Comparative toners 1 to 3 were obtained in the same way as in the production example of toner 1, except that external addition conditions were altered as shown in Table 3. Physical properties of obtained comparative toners 1 to 3 are shown in Table 4.

TABLE 3

| Toner No. | External additive 1 | External additive 2 | External addition time (minutes) |
|---|---|---|---|
| Toner 1 | Silica particles 1 | Silica particles 2 | 5 |
| Toner 2 | Silica particles 1 | Silica particles 3 | 5 |
| Toner 3 | Silica particles 1 | Silica particles 4 | 5 |
| Toner 4 | Silica particles 1 | Silica particles 5 | 5 |
| Toner 5 | Hydrotalcite particles 1 | Silica particles 6 | 5 |
| Toner 6 | Hydrotalcite particles 2 | Silica particles 6 | 7 |
| Toner 7 | Hydrotalcite particles 3 | Silica particles 6 | 5 |
| Toner 8 | Hydrotalcite particles 4 | Silica particles 6 | 5 |
| Toner 9 | Hydrotalcite particles 5 | Silica particles 6 | 5 |
| Toner 10 | Hydrotalcite particles 6 | Silica particles 6 | 5 |
| Toner 11 | Hydrotalcite particles 7 | Silica particles 6 | 10 |
| Toner 12 | Titania particles 1 | Silica particles 6 | 10 |
| Toner 13 | Strontium titanate particles 1 | Silica particles 6 | 10 |
| Toner 14 | Alumina particles 1 | Silica particles 6 | 20 |
| Comparative toner 1 | Titania particles 1 | Silica particles 2 | 10 |
| Comparative toner 2 | Titania particles 2 | HDK-2000 | 10 |
| Comparative toner 3 | — | Silica particles 2 | 10 |

TABLE 4

| Toner No. | Methanol concentration (vol %) | Fixing ratio of fluorine-containing particles (%) | Areal ratio of fluorine-containing particles (%) | Mg/Al ratio | F/Al ratio |
|---|---|---|---|---|---|
| Toner 1 | 5 | 30 | 0.38 | — | — |
| Toner 2 | 30 | 30 | 0.43 | — | — |
| Toner 3 | 10 | 30 | 0.42 | — | — |
| Toner 4 | 25 | 30 | 0.42 | — | — |
| Toner 5 | 20 | 30 | 0.07 | 4.5 | 0.65 |
| Toner 6 | 20 | 40 | 0.54 | 4.5 | 0.60 |
| Toner 7 | 20 | 30 | 0.41 | 4.0 | 0.30 |
| Toner 8 | 20 | 30 | 0.40 | 4.5 | 0.20 |
| Toner 9 | 20 | 30 | 0.39 | 1.5 | 0.01 |
| Toner 10 | 20 | 30 | 0.41 | 1.3 | 0.02 |
| Toner 11 | 20 | 60 | 0.41 | 2.8 | 0.10 |
| Toner 12 | 30 | 60 | 0.40 | — | — |
| Toner 13 | 30 | 60 | 0.40 | — | — |
| Toner 14 | 30 | 95 | 0.41 | — | — |
| Comparative toner 1 | 2 | 60 | 0.42 | — | — |
| Comparative toner 2 | 40 | 60 | 0.42 | — | — |
| Comparative toner 3 | 2 | 60 | — | — | — |

In the table, "Methanol concentration" is the methanol concentration at which the transmittance of light having a wavelength of 780 nm is 50% in a wettability test of the toner in a mixed methanol/water solvent. "Fixing ratio of fluorine-containing particles" is the fixing ratio of fluorine-containing particles to toner particles. "Areal ratio of fluorine-containing particles" is the areal ratio of fluorine-containing particles relative to toner particles in an EDS measurement field of view. HDK-2000 is a type of hydrophobic silica particle produced by Wacker Chemie AG.

It was confirmed that fluorine and aluminum were present in the inner part of the added hydrotalcite particle in line analysis in STEM-EDS mapping analysis of toners 5 to 11.

Toner Evaluations

Toner evaluations were carried out using a modified version of a commercially available "LBP7600C" laser beam printer produced by Canon Inc. The printer was modified by altering the gears and software of the evaluation apparatus main body so that speed of rotation of a developing roller was set so as to rotate at 1.2 times the peripheral speed of the drum. The toner was evaluated in terms of dropping, solid image following properties and fogging. The evaluation results are shown in Table 5.

Durability Evaluation

Following completion of a printing test in which 5000 and 10000 horizontal line images were printed at a print percentage of 1% in a high temperature high humidity environment (a temperature of 33° C. and a relative humidity RH of 85%), a solid image (laid-on level: 0.6 mg/$cm^2$) was printed on letter-sized XEROX 4200 paper (produced by XEROX, 75 g/$m^2$), and solid image following properties was evaluated. In the solid image following properties evaluation, the occurrence of blank dots in a solid image were confirmed.

In the solid image mentioned above, the reflectance (%) of a non-image portion was measured using a "REFLECTOMETER MODEL TC-6DS" (produced by Tokyo Denshoku Co., Ltd.). Fogging was evaluated using a numerical value (%) determined by subtracting the obtained reflectance from the reflectance (%) of an unused sheet of printing paper (a reference paper), which was measured in the same way. A smaller numerical value means that image fogging is suppressed.

After allowing the printer to rest overnight, solid white images were printed with the same timing, and dropping was evaluated. Moreover, dropping means a case where a toner falls onto a non-image portion and is printed because a developing roller or drum cannot hold the toner, and this tends to occur in an initial printing stage when printing is carried out using a toner having poor charge rising performance.

Dropping Evaluation Criteria

A: Did not occur

B: Slight dropping occurred, but recovery occurred within 3 prints

C: Slight dropping occurred, but recovery occurred within 10 prints

D: Dropping occurred, but recovery occurred within 50 prints

E: Dropping occurred, and recovery did not occur within 50 prints

An evaluation of C or better was assessed as being good.

Solid Image Following Properties Evaluation Criteria

A: Did not occur

B: Occurred slightly at edge of third print

C: Occurred on third print

D: Occurred on second print

E: Occurred on first print

An evaluation of C or better was assessed as being good.

Fogging Evaluation Criteria

A: Less than 0.5%

B: At least 0.5% but less than 1.5%

C: At least 1.5% but less than 3.0%

D: Not less than 3.0% but less than 4.5%

E: At least 4.5%

An evaluation of C or better was assessed as being good.

TABLE 5

| Toner | Dropping | | Solid image following properties | | Fogging evaluation | |
|---|---|---|---|---|---|---|
| No. | 5000 prints | 10000 prints | 5000 prints | 10000 prints | 5000 prints | 10000 prints |
| Toner 1 | C | C | C | C | C (1.5%) | C (2.2%) |
| Toner 2 | C | C | C | C | C (1.5%) | C (2.3%) |
| Toner 3 | B | C | C | C | B (0.9%) | C (1.8%) |
| Toner 4 | C | C | B | C | C (1.6%) | C (2.4%) |
| Toner 5 | A | B | B | B | B (0.7%) | B (1.4%) |
| Toner 6 | A | B | A | B | A (0.3%) | B (0.9%) |
| Toner 7 | A | B | B | B | A (0.4%) | B (1.2%) |
| Toner 8 | A | B | B | B | A (0.3%) | B (1.1%) |
| Toner 9 | B | C | B | B | A (0.3%) | B (1.1%) |
| Toner 10 | A | B | B | B | A (0.3%) | B (1.0%) |
| Toner 11 | A | A | A | A | A (0.2%) | A (0.3%) |
| Toner 12 | A | A | A | B | A (0.4%) | B (0.9%) |
| Toner 13 | A | A | A | B | A (0.2%) | B (0.8%) |
| Toner 14 | A | A | A | B | A (0.2%) | B (0.7%) |
| Comparative toner 1 | C | D | C | D | D (3.9%) | E (10.1%) |
| Comparative toner 2 | B | C | D | E | C (2.5%) | D (4.2%) |
| Comparative toner 3 | C | D | D | E | D (4.3%) | E (13.2%) |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-029572, filed Feb. 28, 2022, which is hereby incorporated by reference herein in its entirety.

What is claimed is:

1. A toner, comprising:

a toner particle comprising a binder resin; and an external additive at the surface of the toner particle, the external additive comprising a fluorine-containing hydrotalcite particle, wherein the methanol concentration at which the transmittance of light having a wavelength of 780 nm is 50% in a wettability test of the toner in a mixed methanol/water solvent is 5 to 35 vol %, fluorine and aluminum are present in an inner part of the fluorine-containing hydrotalcite particle in line analysis in STEM-EDS mapping analysis of the toner, a concentration ratio of the number of fluorine atoms relative to aluminum atoms (F/Al) in the fluorine-containing hydrotalcite particle is 0.02 to 0.60 as determined by primary component mapping of the fluorine-containing hydrotalcite particle in STEM-EDS mapping analysis of the toner, and a fixing ratio of the fluorine-containing particle to the toner particle is 40 to 95%.

2. The toner according to claim 1, wherein the external additive comprises a silica particle that does not contain fluorine.

3. The toner according to claim 2, wherein the loss on heating the silica particle that does not contain fluorine from 200 to 400° C. is 0.5 to 8 mass % as determined using a thermal analysis apparatus.

4. The toner according to claim 1, wherein the methanol concentration in the wettability test is 10 to 30 vol %.

5. The toner according to claim 1, wherein the fluorine-containing hydrotalcite particle comprises magnesium and aluminum, and the concentration ratio of the number of magnesium atoms relative to aluminum atoms (Mg/Al) in the fluorine-containing hydrotalcite particle is 1.3 to 4.5 as determined by primary component mapping of the hydrotalcite particle in STEM-EDS mapping analysis of the toner.

6. The toner according to claim 1, wherein primary particles of the fluorine-containing hydrotalcite particle have a number average particle diameter of 60 to 1000 nm.

7. The toner according to claim 1, wherein the areal ratio of the fluorine-containing particle relative to the toner particle in an EDS measurement field of view is 0.07 to 0.54% as measured by STEM-EDS mapping analysis of the toner.

* * * * *